United States Patent [19]

Watanabe et al.

[11] 4,414,272

[45] Nov. 8, 1983

[54] SHAPED POLYESTER COMPOSITE MATERIAL HAVING ACTIVATED SURFACE THEREOF AND PROCESS FOR PRODUCING THE SAME

[75] Inventors: Hirosuke Watanabe; Tadahiko Takata, both of Ibaraki, Japan

[73] Assignee: Teijin Limited, Osaka, Japan

[21] Appl. No.: 302,856

[22] Filed: Sep. 16, 1981

[30] Foreign Application Priority Data

| Jul. 10, 1980 | [JP] | Japan | 55-93239 |
| Sep. 22, 1980 | [JP] | Japan | 55-130619 |
| Sep. 22, 1980 | [JP] | Japan | 55-130620 |
| Oct. 31, 1980 | [JP] | Japan | 55-152215 |
| Feb. 17, 1981 | [JP] | Japan | 56-20824 |
| May 22, 1981 | [JP] | Japan | 56-76727 |
| May 22, 1981 | [JP] | Japan | 56-76728 |
| May 25, 1981 | [JP] | Japan | 56-78002 |
| May 25, 1981 | [JP] | Japan | 56-78003 |
| May 28, 1981 | [JP] | Japan | 56-79978 |

[51] Int. Cl.³ .................. B32B 5/16; B32B 27/36; B32B 5/08
[52] U.S. Cl. .................. 428/331; 428/373; 428/375; 428/391; 428/395; 428/411; 428/413; 428/423.7; 428/423.9; 428/447; 428/480; 428/483; 428/492
[58] Field of Search ............ 428/405, 331, 373, 391, 428/423.7, 480, 447, 413, 411, 423.9, 492, 483, 375, 395

[56] References Cited

U.S. PATENT DOCUMENTS

| 2,870,044 | 1/1959 | Blatz | 428/480 |
| 3,131,087 | 4/1964 | Paquet | 428/331 |
| 3,419,460 | 12/1968 | Ure | 428/331 |
| 3,617,352 | 11/1971 | Shima | 428/423.7 |
| 3,619,244 | 11/1971 | Stanley | 428/480 |
| 4,031,288 | 6/1977 | Bhakuni | 428/480 |
| 4,151,154 | 4/1979 | Berger | 428/405 |
| 4,177,315 | 12/1979 | Ubersax | 428/331 |
| 4,251,576 | 2/1981 | Osborn | 428/331 |
| 4,336,284 | 6/1982 | Wallace | 428/405 |

FOREIGN PATENT DOCUMENTS 57-47917 3/1982 Japan ................... 428/373

Primary Examiner—Ellis P. Robinson
Attorney, Agent, or Firm—Burgess, Ryan & Wayne

[57] ABSTRACT

A shaped polyester composite material having an excellent bonding property to rubber, comprises a shaped substrate comprising an aromatic linear polyester matrix and 0.3 to 15%, based on the weight of the matrix, of silicon dioxide fine particles having an average size of 5 to 100 millimicrons and dispersed in at least a surface portion of the substrate, and;
a surface coating layer formed on the fine particle-containing surface portion of the substrate and comprising a surface-activating material consisting of at least one member selected from silane coupling compounds and organic titanium compounds, the surface coating layer having been heat treated at a temperature of 50° C. or more but at least 10° C. below the melting point of the polyester matrix.

32 Claims, No Drawings

SHAPED POLYESTER COMPOSITE MATERIAL HAVING ACTIVATED SURFACE THEREOF AND PROCESS FOR PRODUCING THE SAME

FIELD OF THE INVENTION

The present invention relates to a shaped polyester composite material having an activated surface thereof and a process for producing the same. More particularly, the present invention relates to a shaped polyester composite material, for example, polyester filament or fiber or film composite material, having a surface thereof which exhibits an excellent bonding property to rubber or other polymeric material, and a process for producing the same.

BACKGROUND OF THE INVENTION

It is known that shaped polyester articles, for example, polyethylene terephthalate filaments, fibers or films, exhibit an excellent tensile strength, dimensional stability, Young's modulus and resistance to fatigue and creep, and, therfore, useful as a reinforcing material, for example, car tires, conveyer belts, V-belts and hoses.

However, it is also known that the polyester articles inherently have a poor bonding property to rubber or other polymeric materials.

It is assumed that the poor bonding property is due to a poor contribution of hydrogen bonds in the ester linkages in the polyester molecules, on the bonding activity thereof. Therefore, when a polyester article is used as the reinforcing material for a rubber article or other polymeric article, the above-mentioned excellent physical properties of the polyester articles cannot be satisfactorily utilized for reinforcing the rubber article or other polymeric article. Accordingly, in order to utilize the polyester articles as the reinforcing material, it is required to significantly improve the bonding property of the polyester articles to rubber or other polymeric materials.

In order to attain this requirement, a number of approaches have been taken in an attempt to enhance the bonding activity of the polyester material. For example, it was attempted to improve the bonding property of the polyester material by treating the surface of the polyester material with a highly activating compound, for example, an epoxy compound or isocyanate compound. This attempt is disclosed in Japanese Patent Application Publication Nos. 42-11482 and 42-9044(1967). However, the results of the attempt was unsatisfactory. That is, the surface-treated product exhibited an unsatisfactory bonding property to rubber and other polymeric materials, especially, at an elevated temperature. Also, it was found that the improvement in the bonding property caused the resultant improved polyester material to have an excessively high stiffness, a poor processability in a shaping or molding process and a poor resistance to fatigue fracture.

SUMMARY OF THE INVENTION

The object of the present invention is to provide a shaped polyester composite material having an activated surface thereof which exhibits an excellent bonding property to rubber or other polymeric materials, and a process for producing the same.

The above-mentioned object can be attained by the shaped polyester composite material of the present invention and the process of the present invention for producing the same.

The shaped polyester composite material of the present invention comprises:

a shaped substrate comprising a polymeric matrix consisting essentially of an aromatic linear polyester and fine solid particles each comprising mainly silicon dioxide and having an average size of 5 to 100 millimicrons, the silicon dioxide fine solid particles being dispersed at least in a portion of the polyester matrix located in a surface portion of the shaped substrate and the amount of the fine particles being in the range of from 0.3 to 15% based on the weight of the polyester matrix in which the fine particles are dispersed, and;

a surface coating layer formed on the silicon dioxide fine particle-containing surface portion of said shaped substrate and comprising a surface activating material consisting of at least one member selected from the group consisting of silane coupling compounds and organic titanium compounds, the surface coating layer having been heat-treated together with said shaped substrate at a temperature of 50° C. or more but at least 10° C. below the melting point of the polyester matrix.

The process of the present invention comprises the steps of:

preparing a shaped substrate which comprises a matrix-forming material consisting essentially of an aromatic linear polyester and fine solid particles each comprising mainly silicon dioxide and having an average size of 5 to 100 millimicrons, the silicon dioxide fine solid particles being dispersed at least in a portion of the polyester matrix located in a surface portion of the shaped substrate and the amount of the fine particles being in the range of 0.3 to 15% based on the weight of the polyester matrix in which the fine particles are dispersed;

coating the silicon dioxide fine particle-containing surface portion of the shaped substrate with a surface coating liquid containing a surface activating material consisting of at least one member selected from the group consisting of silane coupling compounds and organic titanium compounds, drying the resultant layer of the surface coating liquid formed on the shaped substrate, and;

heat-treating the resultant precursory composite material at a temperature of 50° C. or more but at least 10° C. below the melting point of the polyester matrix.

DETAILED DESCRIPTION OF THE INVENTION

In the present invention, the shaped polyester composite material comprises a shaped substrate and a surface coating layer formed on a surface of the shaped substrate.

The shaped substrate comprises a polymeric matrix consisting essentially of an aromatic linear polyester and fine solid particles comprising mainly silicon dioxide.

The aromatic linear polyester usable for the present invention preferably may be selected from polymerization products of a dicarboxylic acid component consisting of at least one aromatic dicarboxylic acid, for example, terephthalic acid; isophthalic acid; naphthalene dicarboxylic acid or diphenyl dicarboxylic acid or the corresponding functional derivatives of the above-mentioned dicarboxylic acids with a glycol component consisting of at least one glycol compound, for example, ethylene glycol, trimethylene glycol, tetramethylene glycol or hexamethylene glycols. Especially, it is preferable that the aromatic linear polyester has at least 85% by molar amount of recurring units of the formula (I):

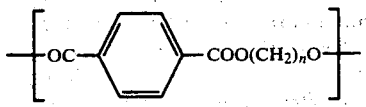

wherein n represents an integer of 2 to 6.

More especially, the aromatic linear polyester usable for the present invention is preferably selected from polymerization products of terephthalic acid or naphthalene dicarboxylic acid with ethylene glycol or tetramethylene glycol.

In the polyester, the dicarboxylic acid component may contain, in addition to the above-mentioned aromatic dicarboxylic acid, at least one additional dicarboxylic acid selected from, for example, diphenoxyethane dicarboxylic acid, β-oxyethoxy benzoic acid, p-hydroxybenzoic acid, sebacic acid, adipic acid, oxalic acid, or 1,4-cyclohexane dicarboxylic acid. Also, the glycol component may contain, in addition to the above-mentioned glycol compound, at least one additional diol compound, for example, cyclohexane-1,4-dimethyl alcohol, neopentyl glycol, bisphenol A or bisphenol S.

The fine solid particles comprises silicon dioxide, SiO₂, preferably in a molar amount of 80% or more. The silicon dioxide may be in any forms of crystals, for example, quartz, cristobalite, tridymite, lechatelierite or opal, or in the amorphous form. In view of reaction activity, especially, to the surface-activating material, it is preferable that the silicon dioxide is amorphous. The amorphous silicon dioxide can be prepared by burning silicon tetrachloride in the presence of molecular oxygen. The resultant amorphous silicon dioxide contains a number of silanol radicals (Si-OH). The silicon dioxide fine particles have an average size of from 5 to 100 millimicrons, preferably, 7 to 50 millimicrons.

In view of the industrial production, it is difficult to produce the fine particles of silicon dioxide having an average size of less than 5 millimicrons. Also, if the average size is more than 100 millimicrons, the resultant mixture of the polyester matrix with the silicon dioxide fine particles exhibits a poor shaping property and processing property. That is, when the mixture is subjected to a melt-extruding procedure, for example, a melt spinning or melt film-forming procedure, the large size of the particles causes the extruding pressure for the mixture to undesirably increase. Also, resultant product exhibits a poor drawability.

The silicon dioxide fine particles are dispersed in at least a portion of the matrix located in a surface layer of the shaped substrate. The silicon dioxide fine particles may be uniformly distributed thoroughly in the polyester matrix in the shaped substrate. Otherwise, the silicon dioxide fine particles may be distributed only in a portion of the polyester matrix located in the surface portion of the shaped substrate.

The amount of the silicon dioxide fine particles is in the range of from 0.3 to 15%, by weight preferably, from 0.5 to 10%, based on the weight of the polyester matrix in which the fine particles are dispersed.

When the amount of the silicon dioxide fine particles is less than 0.3%, the resultant shaped substrate exhibits an unsatisfactory activity to the surface activating material and, therefore, resultant shaped polyester composite material exhibits a poor bonding property to rubber or other polymeric materials. Also, if the amount of the silicon dioxide fine particles is more than 15% by weight, the resultant mixture of the polyester matrix of the silicon dioxide fine particles exhibits a poor shaping and processing property. The shaped substrate of the present invention is not limited to a specific form of the substrate. Usually, the shaped substrate is in the form of a filament or fiber, or in the form of a film or sheet.

When the shaped substrate is in the form of a filament or fiber, the filament or fiber may be simple filament or fiber or composite filament or fiber. The simple filament or fiber may be a regular filament or fiber or a hollow filament or fiber made from a mixture of the polyester matrix and the silicon dioxide fine particles. The composite filament or fiber may be composed of a core portion thereof comprising an aromatic linear polyester alone, and a sheath portion thereof formed around the core portion and comprising the polyester matrix and the silicon dioxide fine particles. In this case, it is preferable that the weight of the sheath portion is in the range of 5 to 40% based on the entire weight of the filament or fiber substrate. Also, it is preferable that the aromatic linear polyester in the core portion exhibits an intrinsic viscosity of 0.6 or more, determined in o-chlorophenol at a temperature of 30° C.

In the case where the shaped substrate is in the form of a film or sheet, the silicon dioxide fine particles may be in both the surface portion or in either one surface portion of the film or sheet substrate.

In the shaped polyester composite material of the present invention, the surface coating layer is formed on the shaped substrate. The surface coating layer comprises a surface-activating material consisting of at least one member selected from the group consisting of silane coupling compounds and organic titanium compounds, which has been heat-treated on the shaped substrate at a temperature of 50° C. or more but at least 10° C. below the melting point of the polyester matrix.

The surface-activating material is effective for providing an activated surface of the shaped polyester composite material which exhibits an excellent bonding property to rubber or other polymeric materials, when heat-treated on the surface of the silicon dioxide-containing shaped substrate at the above-specified temperature.

Usually, the amount of the surface activating material is in the range of from 0.5 to 10% based on the weight of the shaped substrate.

When the amount of the surface-activating material is excessively small, usually, it is impossible to obtain a satisfactory bonding property of the resultant product to rubber or other polymeric materials. Also, an excessive amount of the surface-activating material not only makes no contribution for increasing the bonding property of the resultant product but also, causes the cost of the resultant product to be excessively high.

The surface-activating material can be selected from the silane coupling compounds and organic titanium compounds which are capable of chemically bonding to the silicon dioxide fine particles embedded in the shaped substrate and of firmly bonding to the rubber or other polymeric materials.

The silane coupling compounds are preferably of the formula (II):

$$R—Si—X_3 \quad (II)$$

wherein R represents a member selected from the group consisting of vinyl, methacryl, allyl, epoxy, hydroxyl, amino and mercapto radicals and organic and inorganic functional radicals each having at least one chlorine atom, and; X represents a member selected from the group consisting of organic and inorganic groups capable of reacting with siloxane radicals and/or silanol radicals.

The silane coupling compound may be selected from the group consisting of vinyl trichlorosilane, vinyl triethoxysilane, vinyl trimethoxysilane vinyl-tris($\beta$-methoxyethoxy)-silane, $\gamma$-methacryloxypropyltrimethoxysilane, $\gamma$-methacryloxypropyl-tris($\beta$-methoxyethoxy)silane, $\beta$-(3,4-epoxycyclohexyl)ethyltrimethoxysilane, $\gamma$-glycidoxypropyltrimethoxysilane, vinyl triacetoxysilane, $\gamma$-mercaptopropyltrimethoxysilane, $\gamma$-aminopropyltriethoxysilane, N-$\beta$(aminoethyl)-$\gamma$-aminopropyltrimethoxysilane, bis($\beta$-hydroxyethyl)-$\gamma$-aminopropyltrimethoxysilane, $\gamma$-chloropropyltrimethoxysilane, N-(trimethoxysilylpropyl)diethylenetriamine, N-(trimethoxysilylpropyl) urea, carboethoxyethylaminopropyltriethoxysilane, chloromethylphenyltrimethoxysilane, phenylaminopropyltrimethoxysilane, aminophenyltrimethoxysilane, and N-(dimethoxymethylsilylpropyl)ethylenediamine.

When the silane coupling compound is applied onto the surface of the silicon dioxide-containing a shaped substrate, and heat-treated thereon at a specific temperature, the silane coupling compound reacts with the siloxane radicals and/or silanol radicals contained in the silicon dioxide fine particles located in the surface portion of the shaped substrate so that the silane coupling compound is fixed to the silicon dioxide fine particles. That is, the radical X in the silane coupling compound reacts with the siloxane radical in the silicon dioxide fine particles in the manner of a ring-opening addition, or the radical X reacts with the silanol radical in the silicon dioxide fine particles in the manner of a condensation or a dehydrochlorination. The reaction product has a number of free R radicals which exhibit a high degree of bonding activity to rubber or other polymeric materials, for example, polyester resins. That is, the R radical is capable of reacting with rubber or other polymeric materials in the manner of radical polymerization, ring-opening polymerization and/or dehydration condensation.

Accordingly, the silane coupling compound is effective for chemically coupling the surface of the shaped substrate to the rubber or other polymeric materials.

The organic titanium compounds usable for the present invention are titanium compounds having at least one radical of the formula:

$$—Ti—O—C—$$

Usually, the organic titanium compounds are preferably, of the formula (III):

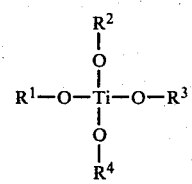

wherein $R^1$, $R^2$, $R^3$ and $R^4$ respectively represents, independently from each other, a member selected from the group consisting of alkyl, alkenyl and acyl radicals each having 2 to 24 carbon atoms, The organic titanium compound may be selected from the group consisting of tetra-n-butyltitanate, tetrakis-(2-ethylhexyl)titanate, tetrastearyltitanate, iso-propyl-tri-iso-stearoyltitanate and iso-propyl-iso-stearoyl-dimethacroyltitanate.

The organic titanium compounds can activate the surface of the shaped substrate containing the silicon dioxide fine particles, in the following manner.

When the organic titanium compound is applied onto the surface of the silicon dioxide-containing shaped substrate, and heat treated thereon at a specific temperature, at least one of the reactive radicals, —Ti—O—C—, in the titanate compound reacts with the siloxane and/or silanol radicals in the silicon dioxide fine particles so as to form a group of the formula, —Ti—O—Si—. That is, the surface of the shaped substrate is covered with the titanium-containing reactive layer having the remaining reactive radicals —Ti—O—C— and chemically fixed to the silicon dioxide fine particles. The remaining reactive radicals exhibit an enhanced bonding property to rubber and other polymeric materials. That is, the remaining reactive radicals —Ti—O—C— can react with rubber or other polymeric materials in the manner of radical polymerization, ring-opening polymerization and/or dehydration condensation.

The surface coating layer may contain an additional material comprising at least one polyepoxide compound, in addition to the surface-activating material, the additional material having been heat-treated on the shaped substrate at a specific temperature.

The polyepoxide compound usable for the present invention contains at least two epoxy groups per molecule of the compound, the amount of the epoxy groups in the compound being a gram equivalent of 0.2 or more per 100 g of the compound. The polyepoxide compound may be selected from the group consisting of reaction products of polyhydric alcohols with halogenated epoxide compounds, reaction products of polyhydric phenol compounds with halogenated epoxide compounds and oxidation products of unsaturated organic compounds having at least one aliphatic double bond with peracetic acid or hydrogen peroxide. The above-mentioned polyhydric alcohol may be selected from the group consisting of ethylene glycol, glycerol, diglycerol, diethylene glycol, sorbitol, pentaerythritol trimethylol propane, polyethylene glycols, and polypropylene glycols. Also, the above-mentioned halogenated epoxide compound is epichlorohydrine. The polyhydric phenol compound mentioned above may be selected from the group consisting of resorcin, catechol, 2,2-bis (4-hydroxyphenyl) propane, bis (4-hydroxyphenyl) dimethylmethane, phenol-formaldehyde resins and resorcin-formaldehyde resins. Furthermore, the above-mentioned oxidation product may be selected from the group consisting of 3,4-epoxycyclohexenepoxide, 3,4-epoxycyclohexylmethyl-3,4-epoxycyclohexene carboxylate and bis (3,4-epoxy-6-methyl cyclohexylmethyl) adipate. The preferable polyepoxide compound for the present invention may be selected from polyglycidyl ethers of polyhydric alcohols, which are reaction products of polyhydric alcohols with epichlorohydrin.

The above-mentioned polyepoxide compound may be used in the state of an aqueous emulsion or solution for the process of the present invention. In order to prepare the aqueous emulsion or solution, the polyepoxide compound is directly, or optionally after dissolving it in a small amount of a solvent, emulsified or dissolved in water, if necessary, in the presence of a surface active agent (emulsifying agent), for example, sodium alkylbenzene sulfonate.

It is preferable that the amount of the additional material in the surface coating layer is in the range of 0.05 to 2% based on the weight of the shaped substrate.

When the polyepoxide compound is heat-treated at a temperature of 50° C. or more, preferably, 150° to 260° C. for 1 to 240 seconds, a portion of the polyepoxide compound penetrates into the polyester matrix and, the epoxy rings in the polyepoxide compound located in and on the shaped substrate are opened, and the ring-opened compound is polymerized in and on the shaped substrate. Therefore, the polyepoxide compound is converted into a hardened polymer firmly fixed in and on the shaped substrate. This hardened polymer is also effective for enhancing the bonding property of the shaped substrate to rubber or other polymeric materials.

The surface coating layer may contain, in addition to the surface activating material and the additional material, a further additional material comprising at least one blocked polyisocyanate compound of the formula (IV):

A—(NHCOY)$_m$           (IV)

wherein Y represents a residue of a blocking compound which residue is capable of dissociating from the blocked polyisocyanate when heat-treated, m represents an integer of 2 or more and A represents an m-valent radical, said further additional material having been heat-treated on the shaped substrate a specified temperature.

The blocked polyisocyanate compound usable for the present invention is an addition product of a polyisocyanate compound with a blocking compound. When the blocked polyisocyanate compound is heated at an elevated temperature, the residue of the blocking agent is capable of dissociating from the blocked polyisocyanate.

The polyisocyanate compound may be selected from the group consisting of tolylene diisocyanate, methaphenylene diisocyanate, diphenylene diisocyanate, hexamethylene diisocyanate, diphenylene diisocyanate, hexamethylene diisocyanate, polymethylenepolyphenyleneisocyanate, triphenylmethane triisocyanate, and polyalkyleneglycol-adduct polyisocyanates which are addition product of above-mentioned polyisocyanate compounds with polyol compounds having two or more activated hydrogen atoms, in the molar ratio of the isocyanate radicals to the hydroxyl radicals of 1:1. The preferable polyisocyanate can be selected from aromatic polyisocyanate compounds, for example, tolylene diisocyanate, methaxylene diisocyanate, diphenylmethane diisocyanate and polymethylene polyphenylisocyanates.

The blocking compound can be selected from the group consisting of phenol compounds, for example, phenol, thiophenol, cresol, resorcin; aliphatic tertiary alcohols, for example, tert-butyl alcohol and tert-pentyl alcohol; aromatic secondary alcohols, for example, diphenyl amine and xylidine; aromatic imides, for example, phthalic acid imide; lactams, for example, caprolactam and valerolactam; oximes, for example, acetoxime, methylethylketoneoxime and cyclohexaneoxime, and; sodium hydrogen sulfite.

The further additional material is used preferably in an amount of 0.1 to 10% based on the weight of the shaped substrate.

When the further additional material is heat-treated on the shaped substrate at a temperature of 50° C. or more, preferably, 100° to 250° C. the blocked polyisocyanate compound is thermally decomposed so as to produce a compound having isocyanate radicals which are highly reactive to rubber or other polymeric materials. Therefore, the heat-treated blocked polyisocyanate compound is effective for enhancing the bonding property of the shaped substrate to rubber or other polymeric materials.

The surface coating layer may contain, in addition to the surface activating material, the additional material and the further additional material, a still further additional material comprising at least one rubber latex, the still further additional material having been heat-treated on the shaped substrate at the specified temperature.

The rubber latex may be selected from the group consisting of natural rubber latexes, styrene-butadiene copolymer latexes, butadiene-vinyl pyridine copolymer latexes, vinyl pyridine-styrene-butadiene terpolymer latexes, acrylonitrile rubber latexes acrylonitril-butadiene copolymer latexes and chloroprene rubber latexes.

The preferable rubber latex is one containing at least 50% by weight of a vinylpyridine-styrene-butadiene terpolymer.

The still further additional material is used preferably, in an amount of 0.1 to 10% based on the weight of the shaped substrate.

The shaped polyester composite material can be produced by the process of the present invention. In the first step of the process, a shaped substrate is prepared from a matrix-forming material consisting essentially of an aromatic linear polyester and fine solid particles comprising mainly silicon dioxide and having an average size of 5 to 100 millimicrons, the silicon dioxide fine solid particles being dispersed in at least a portion of the polyester matrix located in a surface portion of the shaped substrate and the amount of the fine particles being in the range of 0.3 to 15% based on the weight of the polyester matrix in which the fine particles are dispersed.

In the preparation of the shaped substrate, the silicon dioxide fine solid particles may be mixed in any stage in the preparation procedure. For example, the silicon dioxide fine particles can be mixed into a polymerization mixture for producing the matrix-forming polyester in any stage in the polymerization procedure, for example, in an esterification stage, in a condensation stage or after the condensation is finished. Otherwise, the silicon dioxide fine sold particles may be blended with the polyester solid pellets or powder by a conventional mixing apparatus, and, then, the mixture may be melt-mixed by using an extruder. The silicon dioxide fine solid particles may be mixed into a melt of the polyester. The resultant mixture may be melt-shaped into a desired form.

When the shaped substrate is a filament or fiber, which may be of either a regular type or a hollow type, the mixture of the polyester with the silicon dioxide fine particles is melt-spun though a spinneret having one or more spinning holes and the resultant filament or filaments are drawn by a conventional polyester filament or fiber-producing method.

When the shaped substrate is a core-in-sheath type composite filament or fiber, the core portion of the filament or fiber is made from an aromatic linear polyester alone, preferably having an intrinsic viscosity of 0.6 or more, and the sheath portion is made from a mixture of an aromatic linear polyester with the silicon dioxide fine particles. When the intrinsic viscosity of the polyester in the core portion is less than 0.6, the resultant filament or fiber, sometimes, exhibits an unsatisfactory tensile strength, Young's modulus and a poor processability in the melt-spinning and/or drawing procedure. In the core-in-sheath type filament or fiber, it is preferable that the amount of the sheath portion is 5% or more, more preferably in the range of from 5 to 40%, still more preferably, 10 to 30%, based on the entire weight of the filament or fiber. When the amount of the sheath portion is less than 5% by weight, the core portion sometimes is exposed to the outside of the filament or fiber and, therefore, the resultant composite material exhibits an uneven bonding property to rubber or other polymeric material.

The filament or fiber may be in the form of a filament or fiber mass, multifilament yarn, monofialemnt yarn, spun yarn, thread, rope, cord, net, woven fabric, knitted fabric or non-woven fabric.

When the shaped substrate is in the form of a film or sheet, the mixture of the matrix-forming polyester with the silicon dioxide fine particles is melt-extruded through a T-die and if necessary, the resultant fiber or sheet is drawn at a desired draw ratio in one single direction or two directions at a right angle to each other. Also, the silicon dioxide-containing film or sheet may be bonded to one or two surfaces of a base film or sheet comprising the aromatic linear polyester alone, so as to form a two-or three layer-polyester composite substrate.

The film or sheet may be in the form of a type yarn or split yarn or a sheet or net made from the tape yarn and/or split yarn.

In the process of the present invention, the surface of the shaped substrate, wherein the silicon dioxide fine particles are located, is coated with a surface coating liquid containing a surface-activating material consisting of at least one member selected from the group consisting of silane coupling compounds and organic titanium compounds, as described hereinbefore.

Usually, the specified surface-activating material is dissolved in a solvent which may consist of at least one member selected from the group consisting of water, methyl alcohol, ethyl alcohol, trichloroethane, toluene and n-hexane. In the surface coating liquid, it is preferable that the concentration of the surface-activating material is 0.5% by weight or more, more preferably, in the range of from 0.5 to 20% by weight. When the concentration of the surface-activating material is less than 0.5% by weight sometimes it is difficult to impart a desired intensity of the bonding property to rubber to the shaped substrate.

The coating procedure can be carried out by any conventional method, for example, dipping, spraying, brushing, roll coating or doctor knife coating method.

The surface-coating product is heated, preferably at a temperature of 50° to 120° C. so as to dry the layer of the surface coating liuid formed on the shaped substrate and to provide a precursory composite material.

The resultant precursory composite material is heat-treated at a temperature of 50° C. or more, but at least 10° C. below the melting point of the polyester matric, preferably, from 100° to 250° C.

When the heat-treatment temperature is less than 50° C., the reaction rate of the surface activating material with the silicon dioxide fine particles is excessively low. When the heat-treatment temperature is above the point of 10° C. below the melting point of the polyester matrix, the shaped substrate may be thermally deformed, for example, shrunk.

The heat-treatment is usually carried out for a time period of 30 to 300 seconds. Preferably, the heat treatment is carried out by placing the precursory composite material in a nitrogen atmosphere. However, the heat treatment may be carried out in air atmosphere or under vacuum. During the heat-treatment, the shaped substrate may be under a tensioned condition, tensionless condition or relaxed condition.

In the heat treatment procedure, the surface-activating material reacts with the siloxane radicals and/or silanol radicals in the silicon dioxide fine particles located on the surface of the shaped substrate. The resultant surface of the shaped polyester composite material exhibits an enhanced handing property to rubber or other polymeric materials.

The surface coating liquid may contain, in addition to the surface activating material, an additional material comprising at least one polyoxide compound as described hereinbefore, preferably in an amount of 0.05 to 2% based on the weight of the shaped substrate.

Also, the surface coating liquid may contain, in addition to the surface-activating material and the additional material, a further additional material comprising at least one blocked polyisocyanate compound as described hereinabove, preferably, in an amount of 0.1 to 10% based on the weights of the shaped substrate.

Furthermore, the surface coating liquid may contain, in addition to the surface activating material, the additional material and the further additional material, a still further additional material comprising at least one rubber latex as described hereinbefore, preferably, in an amount of 0.1 to 10% based on the weight of the shaped substrate.

When the shaped polyester composite material is bonded to a rubber or other polymeric material, the surface of the composite material may be pre-treated with at least one pre-treating material, before the bonding procedure.

For example, in the core where the surface coating layer comprises the surface-activating material alone, the surface of the shaped polyester composite material may be coated with a first pre-treating material comprising at least one polyepoxide compound as described above, at least one blocked polyisocyanate compound as described above and at least one rubber latex as described above, and then, with a second pre-treating material comprising at least one ethylene urea compound, at least one resorcin-formaldehyde prepolymer or at least one rubber latex as described hereinbefore.

In the first pre-treating material, it is preferably that the amount of the polyepoxide compound is in the range of from 5 to 90%, more preferably, 10 to 50%, based on the sum of the weights of the polyepoxide compound and the blocked polyisocyanate compound. Also, it is preferable that the amount of the rubber latex in the first pre-treating material is in the range of from 50 to 1500%, more preferably, 100 to 1000%, based on the sum of the weights of the polyepoxide compound and the blocked polyisocyanate compound.

Usually, the first pre-treating material is dissolved, emmulsified and/or dispersed in water, and the resultant first pre-treating liquid is applied onto the surface of the shaped polyester composite material. In this case, it is preferable that the total concentration of the first pre-treating material in the first pre-treating liquid is in the range of from 1 to 30%, more preferably, from 3 to 20% by weight.

The first pre-treating material may be emulsified or dispersed in water by using a proper surface active agent, such as an emulsifying or dispersing agent, in an amount of, preferably, 15% or less based on the total dry weight of the first treating composition. When the surface active agent is used in an amount larger than 15%, the resultant pre-treated product may tend to have a relatively poor bonding property to rubber.

The layer of the first pre-treating liquid formed on the surface of the shaped polyester composite material is dried at a temperature of 50° to 120° C. and the resultant product is heat-treated at a temperature of 180° C. or more, but not exceeding the melting point of the polyester matrix, preferably, 220° to 250° C.

It is preferable that the dry weight of the resultant layer of the first pre-treating material is in the range of from 0.1 to 10%, more preferably, from 0.5 to 5% based on the weight of the shaped substrate.

The first pre-treated product is further pre-treated with the second pre-treating material. The second pre-treating material contains at least one ethylene urea compound of the formula (V):

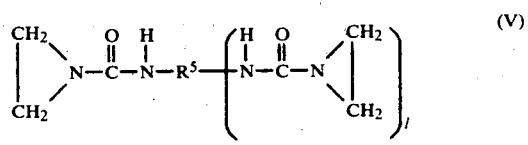

wherein $R^5$ stands for an aromatic or aliphatic hydrocarbon residue and $l$ is 0, 1 or 2.

The ethylene urea compound of the formula (V) may be a reaction product of ethyleneimine with an isocyanate selected from the group consisting of octadecylisocyanate, hexamethylenediisocyanate, isophoronediisocyanate, tolylenediisocyanate, methaxylenediisocyanate, diphenylmethanediisocyanate, naphthylenediisocyanate, and triphenylmethanetriisocyanate.

Also, the second pre-treating material contains at least one resorcin-formaldehyde prepolymer. The resorcin-formaldehyde prepolymer usable for the second pre-treatment is an initial product of a condensation reaction of resorcin with formaldehyde preferably at a molar ratio of from 1:0.1 to 1:8, more preferably, from 1:0.5 to 1:5, still more preferably, from 1:1 to 1:4 in the presence of an alkali catalyst or an acid catalyst.

When heat-treated at a temperature of 120° C. or more, preferably, 100° to 250° C., for 30 to 300 seconds, the resorcin-formaldehyde prepolymer is converted into a completely polymerized resin.

Furthermore, the second pre-treating material contains at least one rubber latex as described hereinabove. The preferably rubber latex is a latex of a rubber material containing at least 50% by weight of a vinyl pyridive-styrene-butadiene terpolymer.

In the above-mentioned second pre-treating material, it is preferably that the ratio in weight of the resorcin-formaldehyde prepolymer to the rubber latex is in a range of from 1:1 to 1:15, more preferably, from 1:3 to 1:12, and that the amount of the ethylene urea compound is in the range of from 0.5 to 30%, more preferably, 1.0 to 20% based on the sum of the weights of the resorcin-formaldehyde prepolymer and the rubber latex.

The mixture of the resorcin-formaldehyde prepolymer and the rubber latex may be aged at a temperature of 15° to 25° C. for 15 hours or more before the ethylene urea compound is mixed thereto.

The second pre-treating material is dissolved, dispersed or emmulsified in a liquid medium, that is, water, to provide a second pre-treating liquid containing 10 to 25% by dry weight of the second pre-treating material.

After the second pre-treating liquid is applied onto the surface of the first pre-treated product, the resultant layer of the second pre-treating liquid formed on the first pre-treated product is dried at a temperature of 50° to 120° C. Thereafter, the resultant second pre-treated product is heat-treated at a temperature of 120° C. or more, but not exceeding the melting point of the polyester matric, preferably, from 180° to 250° C. The resultant pre-treated composite product exhibits an enhanced bonding property to rubber or other polymeric materials.

In the case where the surface coating layer on the shaped substrate contains the polyepoxide compound, the blocked polyisocyanate compound and the rubber latex in addition to the surface-activating material, the surface of the surface coating layer may be coated with a pre-treating material having the same composition as that of the above-mentioned second pre-treating material. In another example of the pre-treatment, in the case where the surface coating layer contains the surface-activating material alone, the surface of the surface coating layer in the composite material is first pre-treated with a first pre-treating material consisting of at least one polyepoxide compound as described hereinbefore, and, then, with a second pre-treating material comprising the resorcin-formaldehyde prepolymer and the rubber latex as described hereinabove.

The polyepoxide compound is used in the form of an aqueous solution, emulsion or dispersion containing 0.5 to 10%, preferably, 1.0 to 5.0% by dry weight of the polyepoxide compound. The first pre-treated product preferably contains 0.1 to 10%, based on the weight of the shaped substrate, of the polyepoxide compound.

After the first pre-treating liquid is applied onto the surface of the composite material and dried, the resultant product is heat-treated at a temperature of 120° C. or more, but not exceeding the melting point of the polyester matrix, preferably, 220° C. to 250° C.

In the second pre-treating material, the ratio in weight of the resorcin-formaldehyde prepolymer to the rubber latex is preferably in the range of from 1:1 to 1:15, more preferably, from 1:3 to 1:12.

The second pre-treating material is used in the form of an aqueous emulsion or solution containing 10 to 25% by dry weight of the mixture of the resorcin-formaldehyde prepolymer and the rubber latex. After the second pre-treating liquid is applied onto the first pre-treated product and dried, the resultant product is heat-treated at a temperature of 120° C. or more, but not exceeding the melting point of the polyester matrix, preferably, from 180° to 250° C.

In the case where the surface coating layer on the shaped substrate contains the polyepoxide compound in addition to the surface-activating material, this type of the shaped polyester composite material is pretreated with a pre-treating material containing the resorcin-formaldehyde prepolymer and the rubber latex in the same composition as that described above. This type of pre-treatment is useful for the case wherein the shaped substrate in the shaped polyester composite material is in the form of a core-in-sheath type composite filament or fiber.

In still another example of the pre-treatment, in the case where the surface coating layer comprises the surface-activating material alone, the shaped polyester composite material is pre-treated with a first pre-treating material comprising at least one polyepoxide compound and at least one blocked polyisocyanate compound as described hereinabove, and, then, with a second pre-treating material comprising at least ethylene urea compound of the formula (V) a prepolymer of a mixture of resorcin with a sulfur-modified resorcin with formaldehyde and a rubber latex.

In the first pre-treating material, the amount of the polyepoxide compound is preferably in the range of from 5 to 90%, more preferably, from 10 to 50%, based on the sum of the weights of the polyepoxide compound and the blocked polyisocyanate compound.

The first pre-treating material is used in the form of an aqueous solution, emulsion or disporsion containing 1 to 30% by dry weight of the first pre-treating material. When the first pre-treating liquid is applied to the shaped polyester composite material, it is preferable that the first pre-treating material is fixed in a dry weight of 0.1 to 10%, more preferably, 0.5 to 5% based on the weight of the shaped substrate, onto the surface of the shaped polyester composite material. For the fixing, the first pre-treated product is heat-treated at a temperature of 180° C. or more, but not exceeding the melting point of the polyester matrix, preferably, from 220° to 250° C.

In the second pre-treating material, the prepolymer of the mixture of resorcin and the sulfur-modified resorcin with formaldehyde is of the formula (VI):

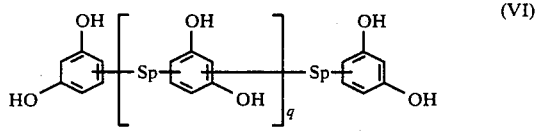

(VI)

wherein p is an integer of 1 to 8 and q is 0 or an integer of 1 to 15.

The sulfur-modified resorcin can be produced by reacting resorcin with sulfur chloride in a reaction medium which is not reactive to sulfur chloride.

In the prepolymer, the molar ratio of the mixture of resorcin and the sulfur-modified resorcin to formaldehyde is usually in the range of 1:0.1 to 1:8, preferably, 1:1 to 1:4.

In the second pre-treating material, the ethylene urea compound is contained in an amount of 0.5 to 30%, preferably, 1.0 to 20%, based on the dry weight of the sum of the prepolymer and the rubber latex. Also, the weight ratio of the prepolymer to the rubber latex is preferably in the range of 1:1 to 1:15, more preferably, 1:3 to 1:12.

The second pre-treating material is used in the form of an aqueous solution, emulsion or dispersion containing 10 to 25% by dry weight of the second pre-treating material. After being applied onto the first pre-treated product, the product is dried and, then, heat-treated at a temperature of 120° C. or more, but not exceeding the melting point of the polyester matrix, preferably, 180° to 250° C. It is preferable that the pretreated product contains 0.5 to 15%, more preferably, 1 to 5% by dry weight of the heat-treated second pre-treating material.

In the case where the surface coating layer on the shaped substrate contains the polyepoxide compound and the blocked polyisocyanate compound as described hereinabove, in addition to the surface-activating material, the surface of the shaped polyester composite material is pre-treated with a pre-treating material having the same composition as that of the above-mentioned second pre-treating material.

In still another example of the pre-treatment, in the case where the surface coating layer in the shaped polyester composite material contains the polyepoxide compound as described hereinabove, in addition to the surface-activating material, the shaped polyester composite material is pre-treated with a pre-treating material comprising the blocked polyisocyanate, the ethylene urea compound of the formula (V), the prepolymer of the formula (VI) of a mixture of resorcin and sulfur-modified resorcin with formaldehyde and the rubber latex as described hereinabove.

In the pre-treating material, the amount of the blocked polyisocyanate is preferably, in the range of 0.5 to 25% more preferably, 5 to 15% based on the dry weight of the sum of the prepolymer and the rubber latex, and the amount of the ethylene urea compound is preferably in the range of 0.5 to 30%, more preferably 1.0 to 20% based on the dry weight of the sum of the prepolymer and the rubber latex. Also, the mixing ratio in weight of the prepolymer to the rubber latex is preferably in the range of from 1:1 to 1:15, more preferably, from 1:3 to 1:12.

The pre-treating material is used in the form of a pre-treating liquid containing 10 to 25% by dry weight of the pre-treating material. The heat-treatment for the pre-treating material is carried out at a temperature of 120° C. or more, but not exceeding the melting point of the polyester matrix, preferably, 180° to 250° C.

The heat-treated product preferably contains 0.5 to 10%, more preferably, 1 to 5% by dry weight of the pre-treating material.

In the above-mentioned type of pre-treatment, either one or both of the blocked polyisocyanate compound and the ethylene urea compound of the formula (V) may be omitted from the pre-treating material.

In another example of the pre-treatment, in the case where the surface coating layer on the shaped substrate contains the polyepoxide compound as described hereinabove, in addition to the surface-activating material, the shaped polyester composite material is pre-treated with a pre-treating material comprising the ethylene urea compound of the formula (V), the resorcin-formaldehyde prepolymer and the rubber latex as described hereinabove.

In the pre-treating material, the amount of the ethylene urea compound is preferably in the range of from 0.5 to 30%, more preferably from 1.0 to 20% based on the sum of the dry weights of the prepolymer and the rubber latex, and the mixing ratio in dry weight of the prepolymer to the rubber latex is preferably in the range of 1:1 to 1:15, more preferably 1:3 to 1:12.

The pre-treating material used is in the form of a pre-treating liquid containing 10 to 25% by dry weight of the pre-treating material. The heat-treatment for the pre-treating material is carried out at a temperature of 120° C. or more, but not exceeding the melting point of the polyester matrix, preferably, from 180° to 250° C. After the heat-treatment, the resultant product contains the heat-treated pre-treating material, preferably in the amount of 0.5 to 10%, more preferably 1 to 5% by weight.

The specific examples presented below will serve to more fully explain how the present invention is practiced. However, it will be understood that these examples are only illustrative and in no way limit the present invention.

In the examples, the following tests were carried out on the resultant products.

1. Peeling resistance

Two tire cords each having a density of 27 threads/2.54 cm were superimposed on each other at an angle of 90 degrees from each other and treated in accordance with the process of the present invention. The resultant reinforcing ply was embedded within a rubber composition for producing a carcass of a tire for an automobile. The rubber composite article thus prepared was subjected to a vulcanizing operation in a press at a temperature of 160° C. for 20 minutes.

In order to determine the bonding strength of the reinforcing ply to rubber, the reinforcing ply was peeled off from the rubber matrix at a rate of 200 mm/minute. The load required to peel off the reinforcing ply from the rubber matrix was shown in a unit of kg/3 cm.

2. Rubber coverage

After the above-mentioned reinforcing ply was peeled off from the rubber matrix, the surface of the reinforcing ply was observed with the naked eye, and the percentage of a total area of the portions of the reinforcing ply surface covered by the rubber based on the whole area of the surface was determined.

3. Resistance to bending

The resistance of the above-mentioned reinforcing ply to bending was determined by using a Gurley type stiffness tester disclosed in U.S. Pat. No. 3,575,761.

4. Heat resistance in rubber matrix

A test specimen (cord) was embedded in a rubber matrix and vulcanized at a temperature of 170° C. for 3 hours. Thereafter, the test specimen was removed from the rubber matrix. The tensile strength ($X_0$) of the specimen before testing was determined, and after the completion of the testing process, the remaining tensile strength ($X_1$) of the specimen was determined. The percentage of the remaining tensile strength of the specimen after the testing process based on that before testing was calculated in accordance with the equation:

$$\text{Remaining tensile strength (\%)} = \frac{X_1}{X_0} \times 100$$

5. T-bonding strength

A cord embedded at a depth of 1 cm within a rubber block and the cord-containing rubber block was vulcanized at a temperature of 150° C. for 30 minutes while being pressed.

In order to determine the T-bonding strength of the cord to rubber, the cord was pulled out from the rubber block at a speed of 200 mm/min.

The T-bonding strength of the cord to rubber was represented by the load in kg/cm necessary to pull out the cord from the rubber block.

6. CRA-bonding strength

Five cords were embedded within a surface layer of a rubber sheet and the cord-containing rubber sheet was vulcanized at a temperature of 150° C. for 30 minutes while being pressed.

In order to determine the CRA-bonding strength, the five cords were peeled from the surface layer of the rubber sheet at a rate of 200 mm/min. The CRA-bonding strength of the cords to the rubber sheet was represented by the load, in kg/5 cords, applied to the cords.

EXAMPLES 1 THROUGH 13 AND COMPARATIVE EXAMPLES 1 THROUGH 3

In each of the Examples 1 through 13 and Comparative Examples 1 through 3, a multifilament yarn having a yarn count of 1280 dtex/192 filaments was prepared from a mixture of an amount, as indicated in Table 1, of silicon dioxide fine particles having an average size as indicated in Table 1 and the balance consisting of a polyethylene terephthalate having an intrinsic viscosity [$\eta$] of 0.64 and a melting point of 260° C., by a usual melt-spining-drawing process.

The multifilament yarn was converted into a cord which was composed of three yarns, each having a first twisting number of 40 turns/10 cm, by finally twisting the three yarns altogether at a ply twisting number of 40 turns/10 cm. The resultant cord was of a yarn count of 4444 dtex/576 filaments. The cord was treated with methyl alcohol and dried at a temperature of 70° C. for 180 seconds.

Separately, a surface coating liquid was prepared by dissolving 3% by weight of a silane coupling compound, as indicated in Table 1, in toluene.

The cord was immersed in the surface coating liquid, withdrawn therefrom, dried at a temperature of 100° C. for 120 seconds and finally, heat-treated at a temperature of 120° C. for 120 seconds. The dried cord contained 1.5%, based on the weight of the cord, of the silane coupling compound.

The resultant polyester composite cord was subjected to the tests for heat resistance in a rubber matrix, CRA-bonding strength, T-bonding strength and peeling resistance. The results are indicated in Table 1.

TABLE 1

| Example No. | | Silicon dioxide fine particles | | Silane coupling compound | Heat resistance in rubber matrix (%) | CRA-bonding strength (kg/5c) | T-bonding strength (kg/cm) | Peeling resistance (kg/3cm) |
|---|---|---|---|---|---|---|---|---|
| | | Average size (mµ) | Amount (% by wt.) | | | | | |
| Example | 1 | 5 | 0.5 | Vinyl trichlorosilane | 68 | 11.3 | 14.0 | 21.0 |
| Example | 2 | 10 | 0.5 | " | 69 | 11.2 | 13.9 | 20.5 |
| Example | 3 | 20 | 0.5 | " | 71 | 11.5 | 14.2 | 20.5 |
| Example | 4 | 50 | 0.5 | " | 72 | 11.5 | 14.4 | 21.0 |
| Example | 5 | 90 | 0.5 | " | 72 | 11.5 | 14.0 | 22.0 |
| Comparative Example | 1 | 110 | 0.5 | " | Failed to melt-spin | | | |
| Comparative Example | 2 | 10 | 0.2 | " | 62 | 11.2 | 12.2 | 18.5 |
| Example | 6 | 10 | 0.5 | " | 69 | 11.2 | 13.9 | 20.0 |
| Example | 7 | 10 | 1.0 | " | 72 | 11.5 | 14.2 | 20.0 |
| Example | 8 | 10 | 13.0 | " | 72 | 12.8 | 16.0 | 25.0 |
| Comparative Example | 3 | 10 | 16.0 | " | 65 | 12.5 | 14.2 | 20.0* |
| Example | 9 | 10 | 0.5 | " | 69 | 11.2 | 13.9 | 20.0 |
| Example | 10 | 10 | 0.5 | Vinyl ethoxysilane | 69 | 11.3 | 13.5 | 21.0 |
| Example | 11 | 10 | 0.5 | γ-glycidoxypropyltrimethoxysilane | 70 | 11.7 | 14.2 | 25.0 |
| Example | 12 | 10 | 0.5 | N—β-(aminoethyl)-γ-aminopropyl-trimethoxysilane | 65 | 11.0 | 12.1 | 21.5 |
| Example | 13 | 10 | 0.5 | γ-mercaptopropylmethoxysilane | 68 | 11.8 | 14.0 | 24.5 |

Note:
*The cord exhibited a poor tensile strength

EXAMPLES 14 THROUGH 17 AND COMPARATIVE EXAMPLES 4 AND 5

In each of Examples 14 through 17 and Comparative Examples 4 and 5, a film having a thickness of 0.03 mm was prepared from a mixture of 0.5% by weight of silicon dioxide fine particles having an average size of about 10 millimicrons and the balance consisting of a polyethylene terephthalate having an intrinsic viscosity of 0.64 and a melting point of 260° C. by a usual film-forming process in which an extruder with a T-die was used and the extruded film was drawn biaxially.

The film was immersed in a surface coating liquid containing 3% by weight of γ-glycidoxypropyltrimethoxysilane dissolved in toluene. The film was withdrawn from the surface coating liquid. The film was coated by 2%, based on the weight of the film, of the surface coating liquid. The coated film was dried and heat-treated at a temperature as indicated in Table 2 for 60 seconds.

The resultant polyester composite film was embedded within a rubber composition for producing a carcass of a tire and vulcanized at a temperature of 120° C. for 90 minutes. The resistance of the composite film to peeling from the rubber matrix was measured. The result is indicated in Table 2.

TABLE 2

| Example No. | | Silane coupling compound Type | Heat-treatment temperature (°C.) | Peeling resistance (kg/3 cm) |
|---|---|---|---|---|
| Comparative Example | 4 | γ-glycidoxypropyl-trimethoxysilane | 40 | 26.5 |
| Example | 14 | γ-glycidoxypropyl-trimethoxysilane | 60 | 28.0 |
| | 15 | γ-glycidoxypropyl-trimethoxysilane | 130 | 28.0 |
| | 16 | γ-glycidoxypropyl-trimethoxysilane | 180 | 28.5 |
| | 17 | γ-glycidoxypropyl-trimethoxysilane | 230 | 28.0 |
| Comparative Example | 5 | γ-glycidoxypropyl-trimethoxysilane | 250 | 20.0 |

EXAMPLES 18 THROUGH 23 AND COMPARATIVE EXAMPLES 6 THROUGH 11

In Example 18, the same polyester multifilament as that described in Example 2 was surface coated with a surface coating liquid containing 5% by weight of γ-glycidoxypropyltrimethoxysilane dissolved in toluene, so that 2% by dry weight of the γ-glycidoxypropyltrimethoxysilane was picked up by the cord. The coated cord was dried and heat-treated at a temperature of 180° C. for 60 seconds. The resultant coated cord was subjected to the tests for the CRA-bonding strength and T-bonding strength.

In Example 19, the same procedures as those described in Example 18 were carried out, except that the heat-treated cord was pre-treated with a pre-treating liquid containing a pre-treating material consisting of a resorcin-formaldehyde prepolymer, vinyl pyridine-styrene-butadiene terpolymer latex and diphenylmethane diethylene urea, so that 4.5% by total dry weight of the pre-treating material was picked up by the cord. The cord was dried at a temperature of 100° C. for 120 seconds and heat-treated at a temperature of 230° C. for 60 seconds.

In Comparative Example 6, a cord prepared from the multifilament yarn which was the same as that described in Example 2 but not containing the silicon dioxide fine particles, in the same manner as that described in Example 1, was surface coated in the same manner as that described in Example 18.

In Comparative Example 7, the same procedures as those described in Comparative Example 6 were carried out, except that the resultant surface coated cord was pre-treated in the same manner as that described in Example 19.

In Example 20, the same procedures as those described in Example 18 were carried out, except that N-(β-aminoethyl)-γ-aminopropyltrimethoxysilane was used as the silane coupling compound.

In Example 21, the same procedures as those described in Example 19 were carried out, except that the same silane coupling compound as that described in Example 20 was used.

In Comparative Example 8, the same procedures as those described in Comparative Example 6 were carried out, except that the same silane coupling compound as described in Example 20 was used.

In Comparative Example 9, the same procedures as those described in Comparative Example 7 were carried out, except that the same silane coupling compound as mentioned in Example 20 was used.

In Example 22, the same procedures as those described in Example 18 were carried out, except that γ-mercaptopropyltrimethoxysilane was used as the silane coupling compound.

In Example 23, the same procedures as those described in Example 19 were carried out, except that the same silane coupling compound as mentioned in Example 22 were used.

In Comparative Example 10, the same procedures as those described in Comparative Example 6 were carried out, except that the same silane coupling compound as mentioned in Example 22 were used.

In Comparative Example 11, the same procedure as those mentioned in Comparative Example 7 were carried out except that the same silane coupling compound as mentioned in Example 22 was used.

The results of the tests are indicated in Table 3.

TABLE 3

| Example No. | | CRA-bonding strength (kg/5 c) | T-bonding strength (kg/cm) |
|---|---|---|---|
| Comparative Example | 6 | 5.9 | 7.5 |
| | 7 | 7.5 | 10.0 |
| Example | 18 | 8.0 | 9.8 |
| | 19 | 11.1 | 17.6 |
| Comparative Example | 8 | 5.8 | 7.4 |
| | 9 | 7.4 | 9.2 |
| Example | 20 | 6.3 | 8.4 |
| | 21 | 9.6 | 15.4 |
| Comparative Example | 10 | 5.8 | 7.6 |
| | 11 | 6.6 | 10.0 |
| Example | 22 | 7.8 | 9.2 |
| | 23 | 10.8 | 16.8 |

EXAMPLES 24 THROUGH 27 AND COMPARATIVE EXAMPLE 12

In Examples 24 through 27, a multifilament yarn having a yarn count of 1070 dtex/192 filaments was produced from an amount, as indicated in Table 4, of silicon dioxide fine particles having an average size as indicated in Table 4 and the balance consisting of a polyethylene terephthalate having an intrinsic viscosity of 0.64 by the usuall melt-spinning-drawing process.

The multifilament yarn was connected into a cord having a yarn count of about 3330 dtex/576 filament in the same manner as that described in Example 1.

The cord was impregnated with a surface coating liquid containing 5% by weight of γ-glycidoxypropyltrimethoxysilane in water, and, then, dried and heat-treated at a temperature of 120° C. for 120 seconds. The dry weight of the silane coupling compound picked up by the cord was 0.8% based on the weight of the cord.

A first pre-treating liquid was prepared by the following procedures.

6 g of sorbitol polyglycidylether which was available under the trademark of DENACOL EX-611 from NAGASE SANGYO CO., JAPAN, was mixed with 4 g of a 30% aqueous solution of sodium dioctylsulfosuccinate which was available under the trademark of NEOCOL SW-30 from DAIICHI KOGYO SEIYAKU CO., JAPAN. The mixture was added to 805 g of water while vigorously stirring the resultant admixture to dissolve DENACOL EX-611 in water.

Separately, 14 g of 4,4'-diphenyl methane dissocyanate-phenol blocking product which was available under the trademark of Hylene MP from Du Pont, 4 g of NEOCOL SW-30 and 42 g of water were mixed by using a ball mill for 24 hours. The resultant dispersion was mixed with the above-mentioned DENACOL EX-611 solution and 125 g of a 40% aqueous emulsion of vinyl pyridinestyrene-butadiene terpolymer which was available under the trademark of NIPPOL 2518 FS from NIPPON ZEON CO., JAPAN. The resultant mixture was used as the first pre-treating liquid 60 g of a 40% solution of a prepolymer of resorcin and formaldehyde in acetone which was prepared by using an acid catalyst, were added to an aqueous solution of 10 g of a 10% aqueous solution of sodium hydroxide and 30 g of a 28% aqueous solution of ammonia in 260 g of water, while stirring the mixture.

Separately, a mixture was prepared by mixing 240 g of NIPPOL 2518 FS and 100 g of a 40% aqueous emulsion of a styrene-butadiene copolymer which was available under the trademark of NIPPOL LX-112 from NIPPON ZEON, with 200 g of water.

The above-mentioned resorcin-formaldehyde prepolymer liquid was gradually mixed with the above-mentioned mixture and 20 g of a 37% aqueous solution of formaldehyde. The resultant mixture was further mixed with an aqueous dispersion which was prepared by mixing 20 g of diphenylmethane diethylene urea, 7 g of NEOCOL SW-30 and 53 g water in a ball mill for 24 hours. The resultant aqueous liquid was used as a second pre-treating liquid.

The surface-coated cord was impregnated with the first pre-treating liquid by using a tire cord-treating machine, dried at 150° C. for 2 minutes and, then, heat treated at 230° C. for one minute. The amount of the first pre-treating material picked up by the cord was 2.2% by dry weight based on the weight of the cord.

The first pre-treated cord was further pre-treated with the second pre-treating liquid, and dried and heat treated in the same manner as that mentioned above. The amount of the second pre-treating material picked up by the cord was 2.5% by dry weight based on the weight of the cord.

The resultant product was subjected to the tests as indicated in Table 4. The results are indicated in Table 4.

TABLE 4

| Example No. | Silicon dioxide fine particles Average size (mμ) | Silicon dioxide fine particles Amount (% by wt.) | Surface coating with silane coupling compound | Composition of first pre-treating liquid (% wt) Polyepoxide | Composition of first pre-treating liquid (% wt) Blocked polyisocyanate | Composition of first pre-treating liquid (% wt) Rubber latex | Second pre-treating material | Results of Tests Heat resistance (%) | CRA-bonding strength (kg/5c) | T-bonding strength (kg/cm) | Peeling resistance (kg/3cm) | Rubber coverage (%) | Resistance to bending (mg) |
|---|---|---|---|---|---|---|---|---|---|---|---|---|---|
| Example 24 | 10 | 0.8 | yes | 0.6 | 1.4 | 5.0 | RFL + diphenylmethane diethylene urea | 85 | 12.5 | 17.0 | 32 | 90 | 2500 |
| Comparative Example 12 | 10 | 0.8 | no | 0.6 | 1.4 | 5.0 | RFL + diphenylmethane diethylene urea | 55 | 6.5 | 11.0 | 16 | 50 | 3500 |
| Example 25 | 90 | 0.8 | yes | 0.6 | 1.4 | 5.0 | | 80 | 12.0 | 16.5 | 31 | 85 | 2000 |
| 26 | 10 | 13 | " | 0.6 | 1.4 | 5.0 | | 85 | 12.5 | 17.0 | 32 | 90 | 2200 |
| 27 | 5 | 0.8 | " | 0.6 | 1.4 | 5.0 | | 80 | 12.2 | 17.0 | 31 | 90 | 2100 |

EXAMPLES 28 THROUGH 31

In each of the Examples 28 through 31, the same procedures as those described in Example 24 were carried out except that the γ-glycidoxypropyltrimethoxysilane was replaced by the silane coupling compound as indicated in Table 5.

TABLE 5

| Example No. | Silane coupling compound | Heat resistance (%) | CRA-bonding strength (kg/5 c) | T-bonding strength (kg/cm) | Peeling resistance (kg/3 cm) | Rubber coverage (%) | Resistance to bending (mg) |
|---|---|---|---|---|---|---|---|
| 28 | Vinyl trichlorosilane | 80 | 12.0 | 16.5 | 31 | 30 | 2500 |
| 29 | N—β(aminoethyl)-γ-aminopropyl-trimethoxysilane | 70 | 11.5 | 16.0 | 28 | 80 | 2900 |
| 30 | η-mercaptopropyl-trimethoxysilane | 85 | 12.5 | 17.0 | 30 | 85 | 2100 |
| 31 | Vinyl ethoxysilane | 80 | 12.0 | 16.5 | 31 | 90 | 2200 |

EXAMPLES 32 THROUGH 35

In each of Examples 32 through 35, the same procedures as those mentioned in Example 24 were carried out, except that the polyepoxide compound, the blocked polyisocyanate compound or the rubber latex was replaced by the substance as indicated in Table 6. The results of the tests were indicated in Table 6.

TABLE 6

| Example No. | Compound | Heat resistance (%) | CRA-bonding strength (kg/5 c) | T-bonding strength (kg/cm) | Peeling resistance (kg/3 cm) | Rubber coverage (%) | Resistance to bending (mg) |
|---|---|---|---|---|---|---|---|
| 32 | Pentaerythritol diglycidylether (Polyepoxide) | 85 | 12.5 | 17.0 | 31 | 85 | 2600 |
| 33 | 4,4'-diphenylmethane di-iso-cyante-ε-caplolactam blocking product (Blocked polyisocyanate) | 80 | 12.0 | 16.5 | 29 | 85 | 2500 |
| 34 | Polymethylene-polyphenylisocyanate-phenol blocking product (Blocked polyisocyanate) | 85 | 12.3 | 16.0 | 30 | 90 | 2300 |
| 35 | Styrene-butadiene copolymer (Rubber latex) | 80 | 12.0 | 16.5 | 31 | 85 | 2200 |

EXAMPLES 36 THROUGH 38

In each of the Examples 36 through 38, the same procedures as those described in Example 24 were carried out, except that the diphenylmethane diethylene urea was replaced by the compounds as indicated in Table 7. The results of the tests are indicated in Table 7.

TABLE 7

| Example No. | Ethylene urea compound | Heat resistance (%) | CRA-bonding strength (kg/5 c) | T-bonding strength (kg/cm) | Peeling resistance (kg/3 cm) | Rubber coverage (%) | Resistance to bending (mg) |
|---|---|---|---|---|---|---|---|
| 36 | Toluene diethylene urea | 85 | 12.0 | 16.5 | 31 | 90 | 2200 |
| 37 | Hexamethylene diethylene urea | 80 | 11.8 | 17.0 | 30 | 90 | 2300 |
| 38 | Triphenylmethane triethylene urea | 80 | 12.5 | 16.5 | 30 | 90 | 2100 |

EXAMPLES 39 THROUGH 42

In the Examples 39 through 42, the same procedures as those of Examples 24, 25, 26, and 27 were respectively carried out except that the surface coating liquid contained additional components corresponding to the components of the first pre-treating liquid, in addition to the surface-activating material, that is, γ-glycidoxypropyltrimethoxysilane, and that the first pre-treatment was omitted. In each example, the total amount of the additional components picked up by the cord was 6% based on the weight of the cord, and the ratio in dry weight of the surface activating material to the additional component was 1:1.

The results of the tests are indicated in Table 8.

TABLE 8

| Example No. | Heat resistance (%) | CRA-bonding strength (kg/5 c) | T-bonding strength (kg/cm) | Peeling resistance (kg/3 cm) | Rubber coverage (%) | Resistance to bending (mg) |
|---|---|---|---|---|---|---|
| 39 | 85 | 12.0 | 17.0 | 31 | 90 | 2100 |
| 40 | 80 | 12.5 | 16.5 | 29 | 85 | 2500 |
| 41 | 85 | 12.0 | 16.5 | 30 | 90 | 2200 |
| 42 | 80 | 12.0 | 17.0 | 30 | 90 | 2400 |

EXAMPLES 43 THROUGH 49 AND COMPARATIVE EXAMPLES 13 THROUGH 22

In each of the Examples 43 through 49 and Comparative Examples 13 through 22, a multifilament yarn having a yarn count of 1670 dtex/192 filaments was prepared from an amount, as indicated in Table 10, of silicon dioxide fine particles having an average size indicated in Table 10, and the balance consisting of a polyethylene terephthalate having an intrinsic viscosity of 0.64, by a usual melt-spinning and drawing process.

During the melt-spinning procedure, the resultant multifilament yarn was coated with a surface coating liquid having a composition as indicated in Table 9, so that 0.5% by dry weight of the surface coating material was picked up by the yarn. The surface coated yarn was dried and then, drawn at a temperature of 230° C.

The drawn multifilament yarn was first twisted at a first twisting number of 40 turns/10 cm. A cord was prepared by ply-twisting two of the above-first twisted multifilament yarn together at a ply-twisting number of 40 turns/10 cm. The resultant cord had a yarn count of about 3340 dtex/384 filaments.

The cord was impregnated with a pre-treating liquid which was prepared by mixing 22 g of resorcin, 29 g of a 37% aqueous solution of formaldehyde, 31 g of a 28% aqueous solution of ammonia and 500 g of water at a temperature of 25° C. for 3 hours while stirring the mixture, by further the resultant solution of resorcin-formaldehyde prepolymer with 418 g of NIPPOL 2518FS at a temperature of 25° C. for 48 hours while stirring the mixture to prepared an RFL emulsion.

The resultant product was subjected to the tests for CRA-bonding strength, T-bonding strength and resistance to peeling. In each test, the vulcanization was carried out at a temperature of 150° C. for 30 minutes or at a temperature of 170° C. for 90 minutes. The results of the tests are indicated in Table 10.

TABLE 9

| Component | Type of surface coating composition (% wt) | | | | | |
|---|---|---|---|---|---|---|
| | A | B | C | D | E | F |
| Polyepoxide compound | | | | | | |
| DENACOL EX-421*[1] | 15 | 20 | 25 | 30 | 40 | 50 |
| Silanecoupling compound | | | | | | |
| γ-glycidoxypropyltrimethoxysilane | 15 | 20 | 25 | — | — | — |
| Surface active agent | | | | | | |
| Dioctyl acetate | 35 | 25 | 15 | 35 | 25 | 15 |
| POE(10)-lauryl amine | 7.5 | 7.5 | 7.5 | 7.5 | 7.5 | 7.5 |
| Oleic acid | 2.5 | 2.5 | 2.5 | 2.5 | 2.5 | 2.5 |
| POE(18)-hardened castor oil ether | 12 | 12 | — | 12 | 12 | — |
| POE(3)-Sodium laurylsulfate | — | — | 2.5 | — | — | 2.5 |
| POE(3) laurylether | 6 | 6 | 15 | 6 | 6 | 15 |
| POE(3) nonylphenol | 7 | 7 | 7.5 | 7 | 7 | 7.5 |

Note:
*[1]Trademark of a polyepoxide resin made by NAGASE SANGYO CO., JAPAN

TABLE 10

| Example No. | | Silicon dioxide fine particles | | Type of Surface coating composition*[2] | Heat resistance (%) | CRA-bonding strength (kg/5C) | | T-bonding strength (kg/cm) | | Resistance to peeling (kg/3 cm) | |
|---|---|---|---|---|---|---|---|---|---|---|---|
| | | Average size (mμ) | Amount (% wt) | | | Vulcanization | | Vulcanization | | Vulcanization | |
| | | | | | | 150° C. 30 min | 170° C. 90 min | 150° C. 30 min | 170° C. 90 min | 150° C. 30 min | 170° C. 90 min |
| Example | 43 | 10 | 0.8 | A | 85 | 11.2 | 9.2 | 16.5 | 11.5 | 31 | 28 |
| | 44 | 10 | 0.8 | B | 80 | 11.5 | 9.1 | 16.2 | 12.0 | 30 | 27 |
| | 45 | 10 | 0.8 | C | 85 | 11.1 | 9.5 | 16.8 | 11.8 | 31 | 27 |
| Comparative Example | 13 | 10 | 0.8 | D | 65 | 10.9 | 5.5 | 16.2 | 7.6 | 30 | 18 |
| | 14 | 10 | 0.8 | E | 60 | 10.8 | 5.8 | 16.0 | 8.0 | 29 | 18.5 |
| | 15 | 10 | 0.8 | F | 65 | 11.0 | 5.6 | 16.3 | 7.8 | 30 | 17.0 |
| Example | 46 | 10 | 13.0 | A | 85 | 11.5 | 9.2 | 16.5 | 11.2 | 31 | 27.5 |
| Comparative Example | 16 | 10 | 16.0 | A | 70 | 10.5 | 5.0 | 15.5 | 7.5 | 29 | 16.5 |
| Example | 47 | 5 | 0.8 | A | 85 | 12.0 | 9.0 | 16.0 | 10.8 | 30 | 26.5 |
| | 48 | 50 | 0.8 | A | 85 | 11.5 | 9.3 | 16.9 | 11.1 | 31 | 26 |

TABLE 10-continued

| Example No. | | Silicon dioxide fine particles | | Type of Surface coating compo- sition*2 | Heat re- sistance (%) | CRA-bonding strength (kg/5C) Vulcanization | | T-bonding strength (kg/cm) Vulcanization | | Resistance to peeling (kg/3 cm) Vulcanization | |
|---|---|---|---|---|---|---|---|---|---|---|---|
| | | Average size (mμ) | Amount (% wt) | | | 150° C. 30 min | 170° C. 90 min | 150° C. 30 min | 170° C. 90 min | 150° C. 30 min | 170° C. 90 min |
| | 49 | 90 | 0.8 | A | 80 | 11.8 | 9.2 | 16.5 | 11.2 | 30 | 25.5 |
| Comparative Example | 17 | 0 | 0 | A | 65 | 8.5 | 3.2 | 12.1 | 6.0 | 31 | 19 |
| | 18 | 0 | 0 | B | 60 | 8.2 | 4.6 | 12.0 | 4.9 | 30 | 18 |
| | 19 | 0 | 0 | C | 60 | 9.0 | 4.0 | 12.5 | 5.6 | 30 | 18 |
| | 20 | 0 | 0 | D | 60 | 11.1 | 5.2 | 16.1 | 8.1 | 31 | 17 |
| | 21 | 0 | 0 | E | 60 | 11.3 | 5.0 | 16.0 | 7.5 | 30 | 12 |
| | 22 | 0 | 0 | F | 60 | 10.9 | 4.6 | 15.8 | 7.5 | 32 | 19 |

Note:
*2Refer to Table 9

EXAMPLES 50 THROUGH 52 AND COMPARATIVE EXAMPLES 23 THROUGH 25

In each of the Example 50 through 52, the same cord as that described in Example 43 was surface coated with a surface coating liquid containing 3% by weight of a surface coating material consisting of the amount as indicated in Table 11, of γ-glycidoxypropyltrimethoxysilane (silane compling compound) and the amount as indicated in Table 11, of DENACOL EX-421 (polyepoxide compound), dissolved in toluene. The coated cord was dried at a temperature of 100° C. for 60 seconds and, then, heat treated at a temperature of 230° C. for 120 seconds.

The surface-coated cord was impregnated in the same manner as that described in Example 43, dried at 100° C. for 60 seconds and, then, heat treated at 230° C. for 120 seconds.

In Comparative Example 23, the same procedures as those described in Example 50 were carried out, except that no silane compling compound used.

In Comparative Example 24, the same procedures as those described in Comparative Example 23 were carried out, except that the cord used was the same as that described in Comparative Example 17 in which no silicon dioxide fine particles were used.

In Comparative Example 25, the same procedures as those described in Example 50 were carried out, except that the cord used was the same as that described in Comparative Example 17.

The results of the tests are indicated in Table 11.

EXAMPLES 53 THROUGH 64 AND COMPARATIVE EXAMPLES 26 THROUGH 28

In each of the Examples 53 through 64 and Comparative Examples 26 through 28, a multifilament yarn having a yarn count of 1670 dtex/250 filaments was prepared from an amount, as indicated in Table 12, of silicon dioxide fine particles having an average size as indicated in Table 12, and a polyethylene terephthalate having an intrinsic viscosity of 0.64 and a melting point of 260° C. The multifilament yarn was converted into a cord having a yarn count of 3340 dtex/500 filaments and composed of two multifilament yarns each having a first twisting number of 40 turns/10 cm by ply twisting the two filament yarns together at a ply twisting number of 40 turns/10 cm.

The cord was washed with methyl alcohol and, then, dried at a temperature of 70° C. for 180 seconds.

The cord was impregnated with a surface coating liquid containing 3% by weight of an organic titanium compound as indicated in Table 12. The impregnated cord was dried at a temperature of 120° C. for 120 seconds and, then, heat-treated at a temperature of 150° C. for 180 seconds. The heat-treated cord contained 1.0% by dry weight of the titanium compound based on the weight of the cord.

The surface coated cord was subjected to tests. The results of the tests are indicated in Table 12.

TABLE 11

| Example No. | | Type of cord | Surface coating composition (part by weight) | | Heat re- sistance (%) | CRA-bonding strength (kg/5C) Vulcanization | | T-bonding strength (kg/cm) Vulcanization | | Resistance to peeling (kg/3 cm) Vulcanization | |
|---|---|---|---|---|---|---|---|---|---|---|---|
| | | | Silane coupling compound | Polyepoxide compound | | 150° C. 30 min | 170° C. 90 min | 150° C. 30 min | 170° C. 90 min | 150° C. 30 min | 170° C. 90 min |
| Comparative Example | 23 | Example 43 | — | 3 | 60 | 10.5 | 5.6 | 16.0 | 8.0 | 29 | 19.0 |
| Comparative Example | 24 | Comparative Example 17 | — | 3 | 55 | 10.6 | 5.5 | 15.5 | 7.9 | 28 | 17.5 |
| Example | 50 | Example 43 | 3 | 3 | 85 | 11.5 | 9.5 | 16.2 | 11.6 | 31 | 26.5 |
| | 51 | Example 43 | 5 | 3 | 85 | 11.8 | 9.9 | 16.3 | 11.8 | 30 | 25.5 |
| | 52 | Example 43 | 10 | 3 | 80 | 11.5 | 9.8 | 15.9 | 11.8 | 29 | 25.0 |
| Comparative Example | 25 | Comparative Example 17 | 3 | 3 | 55 | 10.9 | 5.6 | 15.8 | 8.0 | 29 | 19.5 |

TABLE 12

| Example No. | | Silicon dioxide fine particles | | Organic titanium compound | Heat re-sistance (%) | CRA-bonding strength (kg/5C) | T-bonding strength (kg/cm) | Resistance to peeling (kg/3 cm) |
|---|---|---|---|---|---|---|---|---|
| | | Average size (m) | Amount (% wt) | | | | | |
| Example | 53 | 5 | 0.5 | i-propyl-tri-i-stearoyl titanate | 68 | 9.5 | 10.0 | 21.0 |
| | 54 | 10 | " | " | 70 | 10.0 | 13.1 | 20.0 |
| | 55 | 20 | " | " | 72 | 10.1 | 13.0 | 20.0 |
| | 56 | 50 | " | " | 73 | 10.2 | 14.8 | 21.0 |
| | 57 | 90 | " | " | 72 | 10.1 | 13.5 | 21.5 |
| Comparative Example | 26 | 10 | 0.2 | " | 60 | 10.0 | 10.5 | 18.0 |
| Example | 58 | " | 0.5 | " | 69 | 9.8 | 12.1 | 20.0 |
| | 59 | " | 1.0 | " | 70 | 10.1 | 12.1 | 20.0 |
| | 60 | " | 13.0 | " | 72 | 10.0 | 13.0 | 25.0 |
| Comparative Example | 27 | " | 16.0 | " | 65 | 10.5 | 12.8 | 20.0 |
| Example | 61 | " | 0.5 | " | 70 | 10.2 | 11.9 | 25.0 |
| | 62 | " | " | Tetrastearyl titanate | 70 | 10.1 | 12.1 | 21.0 |
| | 63 | " | " | Tetrakis(2-ethylhexyl) titanate | 69 | 9.8 | 12.2 | 21.5 |
| | 64 | " | " | Tetra-n-butyl titanate | 68 | 9.9 | 12.6 | 24.5 |
| Comparative Example | 28 | — | 0 | i-propyl-tri-i-stearoyl titanate | 52 | 2.1 | 4.5 | 10.5 |

EXAMPLES 65 THROUGH 72 AND COMPARATIVE EXAMPLES 29 THROUGH 36

In each of Examples 65, 67, 69 and 71, the same procedures as those described in Example 54 were carried out, except that the i-propyl-tri-i-stearoyl titanate was replaced by another titanium compound, as indicated in Table 13, the concentration of the titanium compound in the surface coating liquid was 5% by weight, the heat-treatment was carried out at 150° C. for 120 seconds and the dry weight of the titanium compound picked up by the cord was 1.0% based on the weight of the cord.

In Examples 66, 68, 70 and 72, the same procedures as those described respectively in Examples 65, 67, 69 and 71 were carried out, except that before the tests, each surface-coated cord was pre-treated with a pre-treating liquid containing a resorcin-formaldehyde prepolymer, a vinylpyridine-styrene-butadiene terpolymer latex and diphenylmethane diethylene urea. The pre-treated cord was dried at 100° C. for 120 seconds and, then, heat-treated at 230° C. for 60 seconds.

In Comparative Examples 29, 31, 33 and 35, the same procedures as those respectively described in Examples 65, 67, 69 and 71 were carried out except that the cord used was the same as that used in Comparative Example 28 which contained no silicon dioxide fine particles.

In Comparative Examples 30, 32, 34 and 36, the same procedures as those respectively described in Examples 66, 68, 70 and 72 were carried out, except that the cord used was the same as that used in Comparative Example 28.

The results of the tests are indicated in Table 13.

TABLE 13

| Example No. | | Type of cord | Amount of silicon dioxide fine particles (% wt) | Organic titanium compound | Application of Pre-treatment | CRA-bonding strength (kg/5C) | T-bonding strength (kg/cm) |
|---|---|---|---|---|---|---|---|
| Comparative Example | 29 | Comparative | 0 | i-propyl-tri-i-stearoyl titanate | no | 2.1 | 4.5 |
| | 30 | Example 28 | | " | yes | 6.0 | 10.5 |
| Example | 65 | Example 54 | 0.5 | " | no | 10.0 | 13.1 |
| | 66 | | | " | yes | 11.6 | 16.5 |
| Comparative | 31 | Comparative | 0 | Tetrastearyl titanate | no | 2.0 | 3.5 |
| Example | 32 | Example 28 | | " | yes | 5.5 | 8.5 |
| Example | 67 | Example 54 | 0.5 | " | no | 10.1 | 12.1 |
| | 68 | | | " | yes | 11.6 | 16.5 |
| Comparative | 33 | Comparative | 0 | Tetrakis-(2-ethylhexyl) titanate | no | 1.5 | 3.0 |
| Example | 34 | Example 28 | | " | yes | 4.0 | 7.5 |
| Example | 69 | Example 54 | 0.5 | " | no | 9.8 | 12.2 |
| | 70 | | | " | yes | 12.0 | 16.2 |
| Comparative | 35 | Comparative | 0 | Tetra-n-butyl titanate | no | 2.0 | 3.5 |
| Example | 36 | Example 28 | | " | yes | 3.0 | 9.5 |
| Example | 71 | Example 54 | 0.5 | " | no | 9.9 | 12.6 |
| | 72 | | | " | yes | 11.8 | 16.0 |

EXAMPLES 73 THROUGH 81 AND COMPARATIVE EXAMPLES 37 THROUGH 42

In each of the Examples 73 through 81 and Comparative Examples 37 through 42, a core-in-sheath type composite multifilament yarn having a yarn count of 1670 dtex/192 filaments was prepared from a sheath constituent comprising an amount, as indicated in Table 14, of silicon dioxide fine particles having an average size, as indicated in Table 14, and the balance consisting of a polyethylene terephthalate having an intrinsic viscosity of 0.64, and a core constituent consisting of the same polyethylene terephthalate as that mentioned above.

When the above-mentioned multifilament yarn was prepared by the conventional melt-spinning process for core-in-sheath type composite filaments, the filaments were surface coated with a coating liquid having a type of composition as indicated in Table 14. The type of composition is shown in Table 9. During the drawing procedure applied to the multifilament yarn, the yarn was heat-treated at a temperature of 230° C. for 60 seconds.

The surface coated multifilament yarn was converted into a cord consisting of two multifilament yarns each having a first twisting number of 40 turns/10 cm by ply twisting them together at a ply twisting number of 40 turns/10 cm. The resultant cord had a yarn count of about 3340 dtex/384 filaments.

The surface coated cord was pre-treated in the same manner as that mentioned in Example 43, before the tests. The tests were carried out in the same manner as mentioned in Example 43.

The results are indicated in Table 14.

EXAMPLES 82 THROUGH 84 AND COMPARATIVE EXAMPLES 43 THROUGH 45

In each of the Examples 82 through 84, the same procedures as those described in Example 78 were carried out, except that a surface coating liquid containing 3% by dry weight of compounds indicated in Table 15 and the balance toluene was applied to the cord, the surface coated cord was dried at 100° C. for 60 seconds and, then, heat treated at 230° C. for 120 seconds. Then, the surface coated cord was pre-treated by the same procedures as those described in Example 43, before the tests.

In Comparative Example 43, the same procedures as those described in Example 82 were carried out, except that no silane coupling compound was used.

In Comparative Example 44, the same procedures as those described in Comparative Example 43 were carried out, except that the cord used was the same as described in Comparative Example 42 which cord contained no silicon dioxide fine particles.

In Comparative Example 45, the same procedures as those described in Example 82 were carried out, except that the cord used was the same as that used in Comparative Example 42.

The results of the tests are indicated in Table 15.

TABLE 15

| Example No. | | Type of cord | Composition of surface coating liquid (part by weight) | | Tensile strength of cord (kg) | Heat resistance (%) | CRA-bonding strength (kg/5C) Vulcanization | | T-bonding strength (kg/cm) Vulcanization | | Resistance to peeling (kg/3 cm) Vulcanization | |
|---|---|---|---|---|---|---|---|---|---|---|---|---|
| | | | Silane*[1] coupling compound | Poly-*[2] epoxide compound | | | 150° C. 30 min | 170° C. 90 min | 150° C. 30 min | 170° C. 90 min | 150° C. 30 min | 170° C. 90 min |
| Comparative Example | 43 | Example 78 | — | 3 | 20.4 | 60 | 10.5 | 5.6 | 16.0 | 8.0 | 29 | 19.0 |
| | 44 | Comparative Example 42 | — | 3 | 22.5 | 55 | 10.6 | 5.5 | 15.5 | 7.9 | 28 | 17.5 |
| Example | 82 | Example 78 | 3 | 3 | 20.3 | 85 | 11.5 | 9.5 | 18.2 | 11.8 | 31 | 26.5 |
| | 83 | | 5 | 3 | 20.3 | 85 | 11.8 | 9.8 | 17.8 | 12.0 | 30 | 25.5 |
| | 84 | | 10 | 3 | 20.5 | 80 | 11.5 | 9.8 | 17.9 | 11.9 | 29 | 25.0 |
| Comparative Example | 45 | Comparative Example 42 | 3 | 3 | 22.6 | 55 | 10.9 | 5.6 | 15.8 | 8.0 | 29 | 19.5 |

Note:
*[1] glycidoxypropyltrimethoxysilane
*[2] DENACOL EX - 421

EXAMPLES 85 THROUGH 88 AND COMPARATIVE EXAMPLES 46 AND 47

In each of the Examples 85 through 88 and Comparative Examples 46 and 47, a multifilament yarn having a yarn count of 1670 dtex/192 filaments was prepared from an amount, as indicated in Table 16, of silicon dioxide fine particles having an average size as indicated in Table 16, and the balance consisting of a polyethylene terephthalate having an intrinsic viscosity of 0.64. The multifilament yarn was converted into the same cord as that described in Example 43.

TABLE 14

| Example No. | | Silicon dioxide fine particles | | Amount of sheath portion (% wt.) | Type of Surface coating liquid | Tensile strength of cord (kg) | Heat resistance (%) | CRA-bonding strength (kg/5C) Vulcanization | | T-bonding strength (kg/cm) Vulcanization | | Resistance to peeling (kg/3 cm) Vulcanization | |
|---|---|---|---|---|---|---|---|---|---|---|---|---|---|
| | | Average size (mμ) | Amount (% wt.) | | | | | 150° C. 30 min | 170° C. 90 min | 150° C. 30 min | 170° C. 90 min | 150° C. 30 min | 170° C. 90 min |
| Example | 73 | 10 | 0.8 | 10 | A | 22.0 | 84 | 11.2 | 9.1 | 17.5 | 11.9 | 30 | 28 |
| | 74 | 10 | 0.8 | 30 | A | 19.5 | 85 | 11.2 | 9.1 | 17.0 | 11.8 | 31 | 28 |
| | 75 | 10 | 0.8 | 45 | A | 17.9 | 84 | 11.1 | 9.1 | 17.0 | 11.6 | 30 | 28 |
| | 76 | 10 | 0.8 | 20 | B | 20.5 | 84 | 11.5 | 9.3 | 17.4 | 11.8 | 30 | 28 |
| | 77 | 10 | 0.8 | 20 | C | 20.5 | 85 | 11.2 | 9.0 | 17.3 | 11.8 | 30 | 27 |
| Comparative | 37 | 10 | 0.8 | 20 | D | 20.5 | 66 | 10.9 | 5.6 | 16.9 | 7.6 | 29 | 18 |
| Example | 38 | 10 | 0.8 | 20 | E | 20.4 | 64 | 10.8 | 5.8 | 16.0 | 8.0 | 28 | 18.5 |
| | 39 | 10 | 0.8 | 20 | F | 20.5 | 65 | 10.9 | 5.6 | 16.3 | 7.5 | 29 | 18 |
| Example | 78 | 10 | 13.0 | 20 | A | 20.4 | 85 | 11.5 | 9.2 | 17.4 | 11.6 | 30 | 27.5 |
| Comparative Example | 40 | 10 | 16.0 | 20 | A | 20.4 | 75 | 10.5 | 5.5 | 17.0 | 7.8 | 30 | 16.5 |
| Example | 79 | 5 | 0.8 | 20 | A | 20.5 | 85 | 11.5 | 9.0 | 17.5 | 9.0 | 30 | 27.0 |
| | 80 | 50 | 0.8 | 20 | A | 20.4 | 84 | 11.6 | 9.0 | 17.4 | 8.9 | 31 | 28.0 |
| | 81 | 90 | 0.8 | 20 | A | 20.4 | 85 | 11.7 | 9.2 | 17.5 | 8.8 | 30 | 27.0 |
| Comparative | 41 | 110 | 0.8 | 20 | | Failed to melt-spin | | | | | | | |
| Example | 42 | 0 | 0 | 0 | A | 22.5 | 65 | 8.5 | 3.2 | 12.1 | 6.0 | 31 | 19 |

The cord was impregnated with a surface coating liquid containing 5% by weight of γ-glycidoxypropyltrimethoxysilane dissolved in water. The impregnated cord was dried at 230° C. for 60 seconds and, then, heat treated at 120° C. for 120 seconds. The amount of the silane coupling compound picked up by the cord was 0.8% by dry weight based on the weight of the cord.

Before being subjected to the tests, the surface coated cord was pre-treated in the following manner.

A first pre-treating liquid was prepared in such a manner that a uniform solution of 6 g of DENACOL EX-611 in 4 g of NEOCOL SW-30 was added into 805 g of water while vigorously stirring the mixture to provide an aqueous solution of DENACOL EX-611, and, the solution was mixed with a 14 g of Hylene MP with 40 g of NEOCOL SW-30 and 42 g of water which were mixed in a ball mill for 24 hours. The resultant composition was used as the first pre-treating liquid.

The surface coated cord was impregnated with the first pre-treating liquid, dried at 150° C. for 2 minutes and, then, heat-treated at 230° C. for one minute. The dry weight of the first pre-treating material picked up by the cord was 2.2% based on the weight of the cord.

A second pre-treating liquid was prepared in such a manner that an aqueous solution consisting of 10 g of a 10% sodium hydroxide aqueous solution, 30 g of a 28% ammonia aqueous solution and 260 g of water, were mixed with 60 g of a 40% acetone solution of a resorcin-formaldehyde prepolymer which was prepared by using an acid catalyst, to provide an aqueous dispersion, and the prepolymer dispersion was slowly added into an aqueous liquid prepared by mixing 240 g of NIPPOL 2518FS and 100 g of NIPPOL LX-112 into 200 g of water, and, finally, 20 g of a 37% aqueous solution of formaldehyde were further mixed into the above mixture.

The resultant mixture was slowly mixed with 162 g of a 70% aqueous solution of sulfur-modified resorcin which was available under the trademark of SUMIKANOL 750 from SUMITOMO KAGAKU KOGYO CO., JAPAN. The resultant mixture was further mixed with 20 g of diphenylmethane diethylene urea, 7 g of NEOCOL SW-30 and 53 g of water. The mixture was stirred by using a ball mill for 24 hours. The resultant mixture was used as the second pre-treating liquid.

The first pre-treated cord was further pre-treated with the second pre-treating liquid, dried at 150° C. for 2 minutes and, then, heat-treated at 230° C. for one minute. The dry weight of the second pre-treating material picked up by the cord was 2.5% based on the weight of the cord.

The results of the tests are indicated in Table 16.

TABLE 16

| Example No. | | Silicon dioxide fine particles | | Application or surface coating material | Heat resistance (%) | CRA-bonding strength (kg/5C) Vulcanization | | T-bonding strength (kg/cm) Vulcanization | | Resistance to peeling (kg/3 cm) Vulcanization | | Rubber coverage (%) Vulcanization | | Resistance to bending (mg) |
|---|---|---|---|---|---|---|---|---|---|---|---|---|---|---|
| | | Average size (mμ) | Amount (% wt) | | | 150° C. 30 min | 170° C. 90 min | 150° C. 30 min | 170° C. 90 min | 150° C. 30 min | 170° C. 90 min | 150° C. 30 min | 170° C. 90 min | |
| Example | 85 | 10 | 0.8 | yes | 85 | 12.9 | 8.0 | 17.0 | 12.0 | 32 | 27 | 90 | 75 | 2500 |
| Comparative Example | 46 | 10 | 0.8 | no | 85 | 6.5 | 4.5 | 11.0 | 7.0 | 16 | 10 | 50 | 40 | 3500 |
| Example | 86 | 90 | 0.8 | yes | 80 | 12.5 | 8.5 | 16.5 | 12.0 | 32 | 24 | 85 | 70 | 2000 |
| | 87 | 10 | 13 | yes | 85 | 13.0 | 8.5 | 17.5 | 12.5 | 32 | 27 | 90 | 75 | 2200 |
| Comparative Example | 47 | 10 | 16 | yes | 70 | 9.5 | 7.0 | 13.0 | 10.0 | 18 | 15 | 55 | 25 | 3500 |
| Example | 88 | 5 | 0.8 | yes | 80 | 12.5 | 8.5 | 17.0 | 12.5 | 32 | 29 | 90 | 75 | 2100 |

EXAMPLES 89 THROUGH 92

In each of the Examples 89 through 92, the same procedures as those described in Example 85 were carried out, except that the γ-glysidoxypropyltrimethoxysilane was replaced by the type of silane coupling compound as indicated in Table 17.

The results are indicated in Table 17.

TABLE 17

| Example No. | Silane coupling compound | Heat resistance (%) | CRA-bonding strength (kg/5C) Vulcanization | | T-bonding strength (kg/cm) Vulcanization | | Resistance to peeling (kg/3 cm) Vulcanization | | Rubber coverage (%) Vulcanization | | Resistance to bending (mg) |
|---|---|---|---|---|---|---|---|---|---|---|---|
| | | | 150° C. 30 min | 170° C. 90 min | 150° C. 30 min | 170° C. 90 min | 150° C. 30 min | 170° C. 90 min | 150° C. 30 min | 170° C. 90 min | |
| 89 | Vinyl trichlorosilane | 80 | 12.0 | 9.5 | 16.5 | 13.0 | 31 | 27 | 80 | 65 | 2500 |
| 90 | N—β(amincoethyl)-γ-aminopropyl-trimethoxysilane | 70 | 11.5 | 9.0 | 16.0 | 12.5 | 28 | 26 | 80 | 65 | 2900 |
| 91 | γ-mercaptopropyltrimethoxysilane | 85 | 12.5 | 9.5 | 17.0 | 13.5 | 30 | 26 | 85 | 70 | 2100 |
| 92 | Vinyl ethoxysilane | 80 | 12.0 | 9.0 | 16.5 | 13.0 | 31 | 27 | 90 | 70 | 2200 |

EXAMPLES 93, 94 AND 95

In Example 93, the same procedures as those described in Example 85 were carried out, except that the DENACOL EX-611 was replaced by the polyepoxide compound indicated in Table 18.

In each of Examples 94 and 95, the same procedures as those described in Example 85 was carried out, except that the Hylene MP was replaced by the blocked polyisocyanate compound as indicated in Table 18.

The results are shown in Table 18.

TABLE 18

| Example No. | Compound in first pre-treating material | Heat re-sistance (%) | CRA-bonding strength (kg/5C) Vulcanization 150° C. 30 min | CRA-bonding strength (kg/5C) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min | Rubber coverage Vulcanization 150° C. 30 min | Rubber coverage Vulcanization 170° C. 90 min | Resistance to bending (mg) |
|---|---|---|---|---|---|---|---|---|---|---|---|
| 93 | Polyepoxide: peutaerythritol diglycidyl ether | 85 | 12.5 | 10.0 | 17.5 | 13.5 | 32 | 28 | 85 | 50 | 2600 |
| 94 | Blocked polyissocyanate: 4,4'-diphenylmethane diisocyanate-ε-coprolactam-blocking product | 80 | 12.0 | 9.5 | 17.0 | 12.5 | 30 | 27 | 90 | 65 | 2500 |
| 95 | Polymethylene polyphenyl-isocyanate-phenol-blocking product | 85 | 12.5 | 9.5 | 17.5 | 13.0 | 31 | 28 | 85 | 65 | 2300 |

EXAMPLES 96, 97 AND 98

In each of the Examples 96, 97 and 98, the same procedures as those described in Example 85 were carried out, except that the diphenylmethane diethylene urea in the second pre-treating material was replaced by the compound as indicated in Table 19.

TABLE 19

| Example No. | Ethylene urea compound | Heat re-sistance (%) | CRA-bonding strength (kg/5C) Vulcanization 150° C. 30 min | CRA-bonding strength (kg/5C) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min | Rubber coverage Vulcanization 150° C. 30 min | Rubber coverage Vulcanization 170° C. 90 min | Resistance to bending (mg) |
|---|---|---|---|---|---|---|---|---|---|---|---|
| 96 | Toluenediethylene urea | 85 | 12.5 | 9.5 | 16.5 | 13.5 | 31 | 27 | 90 | 70 | 2200 |
| 97 | Hexamethylene diethylene urea | 80 | 12.0 | 10.0 | 17.0 | 14.0 | 31 | 27 | 90 | 75 | 2300 |
| 98 | Triphenylmethane triethylene urea | 80 | 12.5 | 10.5 | 16.0 | 13.5 | 32 | 26 | 90 | 70 | 2100 |

EXAMPLES 99 THROUGH 102

In each of the Examples 99 through 102, the same procedures as those described in Example 85 were carried out, except that a mixture of one part by weight of the surface coating liquid and one part by weight of the first pre-treating liquid was used as the surface coating liquid, the first pre-treating procedures were omitted and the cord used in Example 99 was the same as that used in Example 85, the cord used in Example 100 was the same as that used in Example 86, the cord used in Example 101 was the same as that used in Example 87 and the cord used in Example 102 was the same as that used in Example 88.

The results are shown in Table 20.

described in Example 85 was surface coated with a surface coating liquid containing a surface coating material consisting of 2.5 g of γ-glycidoxypropyltrimethoxysilane and 2.5 g of sorbitol polyglycidylether which was available under a treadmark of DENACOL EX-111 from NAGASE SANGYO CO., JAPAN, dissolved in 95 g of water, by using a tire cord treating machine.

The surface treated cord was dried at 150° C. for 2 minutes and, then, heat-treated at 230° C. for one minute. The dry weight of the surface coating material picked up by the cord was 2.2% based on the weight of the cord.

The surface coated core was pre-treated, before being subjected to the tests, with the following pre-treating liquid.

60 g of a 40% acetone solution of a resorcin-formaldehyde prepolymer which was prepared in the presence of an acid catalyst, were dispered in an aqueous solution which was a mixture of 10 g of a 10% aqueous solution of sodium hydroxide, 30 g of a 28% aqueous solution of ammonia and 260 g of water, while stirring the aqueous dispersion.

A dispersion was prepared by mixing 14 g of HYLENE MP and 42 g of water in a ball mill for 24 hours. This dispersion was uniformly mixed with the above-mentioned aqueous dispersion, to provide an aqueous

TABLE 20

| Example No. | Type of cord used | Heat re-sistance (%) | CRA-bonding strength (kg/5C) Vulcanization 150° C. 30 min | CRA-bonding strength (kg/5C) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min | Rubber coverage Vulcanization 150° C. 30 min | Rubber coverage Vulcanization 170° C. 90 min | Resistance to bending (mg) |
|---|---|---|---|---|---|---|---|---|---|---|---|
| 99 | Example 85 | 85 | 12.5 | 10.0 | 17.5 | 13.5 | 31 | 28 | 90 | 70 | 2100 |
| 100 | Example 86 | 80 | 12.0 | 9.5 | 17.0 | 13.0 | 29 | 26 | 85 | 65 | 2500 |
| 101 | Example 87 | 85 | 12.5 | 10.0 | 16.5 | 12.5 | 30 | 27 | 90 | 65 | 2200 |
| 102 | Example 88 | 80 | 12.0 | 9.5 | 17.0 | 13.5 | 30 | 27 | 90 | 70 | 2400 |

EXAMPLES 103 THROUGH 106 AND COMPARATIVE EXAMPLES 48 AND 49

In each of the Examples 103 through 106 and Comparative Examples 48 and 49, the same cord as that dispersion mixture. Separately, an aqueous emulsion was prepared mixing 100 g of NIPPOL 2518 FS and 100 g NIPPOL LX-112 with 200 g of water.

The above-mentioned aqueous dispersion mixture was mixed with the aqueous emulsion while slowly stirring the mixture and, then, 20 g of a 37% aqueous solution of formaldehyde were mixed into the mixture.

This mixture was further mixed with 162 g of a 70% aqueous solution of a sulfur-modified resorcin-formaldehyde prepolymer, which was available under the trademark of SUMIKANOL 750 from SUMITOMO KAGAKU KOGYO CO., JAPAN, while slowly stirring the resultant mixture, and, then, with a dispersion which was prepared by mixing 20 g of diphenylmethane diethylene urea, 7 g of NEOCOL SW-30 and 53 g of water in a ball mill for 24 hours. The resultant mixture was used as a pre-treating liquid.

The surface-coated cord was pre-treated with the pre-treating liquid, dried at 150° C. for 2 minutes. The dry weight of the pre-treating material picked up by the cord was 2.5% based on the weight of the cord.

The pre-treated cord was subjected to the tests for the items as indicated in Table 21. The results of the tests are also indicated in Table 21.

EXAMPLES 111 THROUGH 119 AND COMPARATIVE EXAMPLES 50 THROUGH 54

In each of the Examples 111 through 119 and Comparative Examples 50 through 54, the same procedures as those described in Example 73 were carried out with the following exception.

1. In each example or comparative example, the type of the surface coating material used was the one indicated in Table 23. Each type of the surface coating material had the composition as indicated in Table 9.

2. The cord which was prepared from surface coated core-in-sheath type multifilament yarns, was pretreated, before being subjected to the tests, with the following pre-treating liquid.

A resorcin-formaldehyde prepolymer was prepared by reacting 22 g of resorcin with 29 g of a 37% aqueous solution of formaldehyde in the presence of 31 g of a 28% aqueous solution of ammonia and 500 g of water, at a temperature of 25° C. while stirring the reaction mixture for 3 hours. The reaction mixture was further mixed with 418 g of NIPPOL 2518 FS at a temperature of 25° C. by stirring the mixture for 48 hours. The resultant RFL liquid was mixed with 162 g of SUMIKA-

TABLE 21

| Example No. | Silicon dioxide fine particles | | Heat resistance (%) | CRA-bonding strength (kg/5c) | | T-bonding strength (kg/cm) | | Resistance to peeling (kg/3cm) | | Rubber coverage (%) | | Resistance to bending (mg) |
|---|---|---|---|---|---|---|---|---|---|---|---|---|
| | Average size (mμ) | Amount (% wt) | | Vulcanization | | Vulcanization | | Vulcanization | | Vulcanization | | |
| | | | | 150° C. 30 min | 170° C. 90 min | 150° C. 30 min | 170° C. 90 min | 150° C. 30 min | 170° C. 90 min | 150° C. 30 min | 170° C. 90 min | |
| Example 103 | 10 | 0.8 | 85 | 12.9 | 9.0 | 17.0 | 12.5 | 32 | 7 | 90 | 75 | 2500 |
| Comparative Example 48 | 10 | 0.8 | 60 | 8.0 | 6.5 | 13.0 | 9.0 | 18 | 5 | 50 | 25 | 1800 |
| Example 104 | 90 | 0.8 | 80 | 12.6 | 9.2 | 17.2 | 12.1 | 31 | 6 | 85 | 70 | 2000 |
| Example 105 | 10 | 13 | 80 | 12.2 | 9.3 | 17.1 | 12.3 | 30 | 6 | 85 | 70 | 2100 |
| Comparative Example 49 | 10 | 16 | 70 | 10.9 | 7.6 | 16.0 | 10.0 | 27 | 2 | 80 | 65 | 3500 |
| Example 106 | 5 | 0.8 | 85 | 12.3 | 9.0 | 17.2 | 12.5 | 31 | 7 | 85 | 70 | 2200 |

EXAMPLES 107 THROUGH 110

In each of the Examples 107 through 110, the same procedures as those described in Example 103 were carried out, except that the γ-glycidoxypropyltrimethoxysilane was replaced by the silane coupling compound as indicated in Table 22.

The results of the tests are indicated in Table 22.

NOL 750 (Sulfur-modified) resorcin. The resultant mixture was used as the pre-treating liquid.

The surface coated cord was pretreated with the pre-treating liquid, dried at a temperature of 100° C. for 60 seconds and heat-treated at a temperature of 230° C. for 120 seconds.

The resultant pre-treated cord was subjected to the tests. The results of the tests are indicated in Table 23.

TABLE 22

| Example No. | Silane coupling compound | Heat re-sistance (%) | CRA-bonding strength (kg/5C) | | T-bonding strength (kg/cm) | | Resistance to peeling (kg/3cm) | | Rubber coverage (%) | | Resistance to bending (mg) |
|---|---|---|---|---|---|---|---|---|---|---|---|
| | | | Vulcanization | | Vulcanization | | Vulcanization | | Vulcanization | | |
| | | | 150° C. 30 min | 170° C. 90 min | 150° C. 30 min | 170° C. 90 min | 150° C. 30 min | 170° C. 90 min | 150° C. 30 min | 170° C. 90 min | |
| 107 | Vinyl trichlorosilane | 80 | 12.0 | 9.5 | 16.5 | 13.0 | 31 | 27 | 80 | 65 | 2500 |
| 108 | N—β(aminoethyl)-γ-aminopropyl-trimethoxysilane | 70 | 11.5 | 9.0 | 16.0 | 12.5 | 28 | 26 | 80 | 65 | 2900 |
| 109 | γ-mercaptopropyltri-methoxysilane | 85 | 12.5 | 9.5 | 17.0 | 13.5 | 30 | 26 | 85 | 70 | 2100 |
| 110 | Vinyl ethoxysilane | 80 | 12.0 | 9.0 | 16.5 | 13.0 | 31 | 27 | 90 | 70 | 2200 |

TABLE 23

| Example No. | Silicon dioxide fine particles Average size (mµ) | Silicon dioxide fine particles Amount (% wt) | Amount of sheath portion (% wt) | Type surface coating liquid (*)1 | Tensile strength of cord (kg) | Heat resistance (%) | CRA-bonding strength (kg/5C) Vulcanization 150° C. 30 min | CRA-bonding strength (kg/5C) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min |
|---|---|---|---|---|---|---|---|---|---|---|---|---|
| Example 111 | 10 | 0.8 | 10 | A | 22.0 | 84 | 12.5 | 10.1 | 17.5 | 12.2 | 30 | 28 |
| 112 | 10 | 0.8 | 30 | A | 19.5 | 85 | 13.0 | 10.5 | 18.5 | 12.1 | 31 | 28 |
| 113 | 10 | 0.8 | 45 | A | 17.9 | 84 | 10.8 | 8.6 | 17.5 | 11.6 | 30 | 28 |
| 114 | 10 | 0.8 | 20 | B | 20.5 | 85 | 12.5 | 10.1 | 18.0 | 12.0 | 30 | 28 |
| 115 | 10 | 0.8 | 20 | C | 20.5 | 86 | 12.6 | 10.1 | 18.0 | 12.1 | 30 | 27 |
| Comparative Example 50 | 10 | 0.8 | 20 | D | 20.4 | 65 | 10.9 | 5.8 | 17.0 | 8.0 | 29 | 17 |
| 51 | 10 | 0.8 | 20 | E | 20.5 | 65 | 10.8 | 5.9 | 17.2 | 7.5 | 28 | 19 |
| 52 | 10 | 0.8 | 20 | F | 20.5 | 65 | 10.9 | 6.0 | 16.5 | 8.0 | 29 | 18.5 |
| Example 116 | 10 | 13.0 | 20 | A | 20.5 | 85 | 12.8 | 10.4 | 17.9 | 10.9 | 30 | 27 |
| Comparative Example 53 | 10 | 16.0 | 20 | A | 20.5 | 75 | 10.8 | 5.6 | 17.0 | 9.9 | 30 | 16 |
| Example 117 | 5 | 0.8 | 20 | A | 20.5 | 85 | 12.5 | 9.9 | 17.5 | 11.2 | 31 | 26 |
| 118 | 50 | 0.8 | 20 | A | 20.4 | 84 | 12.1 | 9.8 | 18.0 | 11.9 | 30 | 28 |
| 119 | 90 | 0.8 | 20 | A | 20.4 | 85 | 12.3 | 9.8 | 17.6 | 11.6 | 30 | 27 |
| Comparative Example 54 | — | 0 | 0 | A | 22.5 | 70 | 8.5 | 3.2 | 12.1 | 6.0 | 31 | 19 |

EXAMPLES 120 THROUGH 122 AND COMPARATIVE EXAMPLES 55 THROUGH 57

In Example 120, the same procedures as those described in Example 116 were carried out, except that the surface coating liquid contained a surface coating material consisting of 3% by weight of γ-glycidoxypropyltrimethyoxysilane (silane coupling compound) and 3% by weight of DENACOL EX-421 (Polyepoxide compound), and dissolved in toluene, that the surface coating liquid was applied to the cord which was prepared from the core-in-sheath type multifilament yarns oiled with a usual oiling agent, that the surface coated cord was dried at 100° C. for 60 seconds and, then, heat-treated at 230° C. for 120 seconds, and the dry weight of the surface coating material picked up by the cord was 0.8% based on the weight of the cord.

In each of the Examples 121 and 122, the same procedures as those described in Example 120 were carried out, except that the silane coupling compound and the polyepoxide compound were used in amounts as indicated in Table 24.

In Comparative Example 55, the same procedures as those described in Example 120 were carried out except that no silane coupling compound was used.

In Comparative Example 56, the same procedures as those described in Comparative Example 55 were carried out, except that the cord used was the same as that used in Comparative Example 54.

In Comparative Example 57, the same procedures as those described in Example 120 were carried out, except that the cord used was the same as that used in Comparative Example 54.

The results of the tests are indicated in Table 24.

TABLE 24

| Example No. | Type cord | Surface coating material Silane coupling compound (% by wt) | Surface coating material polyepoxide compound (% by wt) | Tensile strength of cord (kg) | Heat resistance (%) | CRA-bonding strength (kg/5C) Vulcanization 150° C. 30 min | CRA-bonding strength (kg/5C) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min |
|---|---|---|---|---|---|---|---|---|---|---|---|
| Comparative Example 55 | Example 116 | — | 3 | 20.4 | 65 | 10.5 | 6.5 | 16.0 | 8.5 | 29 | 19 |
| Comparative 56 | Example 54 | — | 3 | 22.5 | 60 | 10.8 | 5.8 | 16.0 | 8.4 | 28 | 18 |
| Example 120 | Example 116 | 3 | 3 | 20.3 | 85 | 12.5 | 10.0 | 19.0 | 12.5 | 31 | 27 |
| 121 | Example 116 | 5 | 3 | 20.3 | 88 | 12.4 | 9.8 | 18.5 | 13.5 | 30 | 26.5 |
| 122 | Example 116 | 10 | 3 | 20.5 | 85 | 12.2 | 10.1 | 18.3 | 12.2 | 29 | 25 |
| Comparative Example 57 | Comparative Example 54 | 3 | 3 | 22.6 | 60 | 11.8 | 6.1 | 16.0 | 8.4 | 29 | 19.5 |

EXAMPLES 123 THROUGH 129 AND COMPARATIVE EXAMPLES 58 THROUGH 62

In each of the Examples 123 through 129 and Comparative Examples 58 through 62, the same procedures as those described in Example 43 were carried out with the following exception.

1. In each example or comparative example, the average size and amount of the silicon dioxide fine particles were those as indicated in Table 25, and the type of the surface coating material applied onto the melt-spun multifilament yarn was as indicated in Table 25. The composition of each surface coating material is indicated in Table 9.

2. The cord prepared from the surface coated multifilament yarns was pre-treated, before being subjected to the tests, with the following pre-treating liquid.

In order to prepare the pre-treating liquid, 22 g of resorcin, 29 g of a 37% aqueous solution of formaldehyde, 31 g of a 28% aqueous solution of ammonia and 500 g of water were mixed altogether, the mixture was stirred at a temperature of 25° C. for 3 hours to provide a resorcin-formaldehyde prepolymer solution, the resultant prepolymer solution was mixed with 418 g of NIP- POL 2518FS, the mixture was stirred at 25° C. for 48 hours to provide an RFL emulsion, and the emulsion was mixed with 162 g of SUMIKANOL 750.

The cord was pre-treated with the pre-treating liquid, dried at 100° C. for 60 seconds and, then, heat-treated at 230° C. for 120 seconds. The dry weight of the pre-treating material picked up by the cord was 6.0% based on the weight of the cord.

The results of the tests are indicated in Table 25.

In Comparative Example 63, the same procedures as those described in Example 130 were carried out, except that no silane coupling compound was contained in the surface coating liquid.

In Comparative Example 64, the same procedures as those described in Comparative Example 63 were carried out, except that the cord used was the same as that used in Comparative Example 62.

In Comparative Example 65, the same procedures as

TABLE 25

| Example No. | Silicon dioxide fine particle Average size (mµ) | Silicon dioxide fine particle Amount (% wt.) | Type of surface coating material (*) | Heat resistance (%) | CRA-bonding strength (kg/5c) Vulcanization 150° C. 30 min | CRA-bonding strength (kg/5c) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min |
|---|---|---|---|---|---|---|---|---|---|---|
| Example 123 | 10 | 0.8 | A | 85 | 12.5 | 10.5 | 18.5 | 13.5 | 32 | 29 |
| 124 | 10 | 0.8 | B | 80 | 12.4 | 10.4 | 18.4 | 13.0 | 31 | 29 |
| 125 | 10 | 0.8 | C | 85 | 12.6 | 10.1 | 19.0 | 13.5 | 30 | 27 |
| Comparative Example 58 | 10 | 0.8 | D | 70 | 11.1 | 6.5 | 17.0 | 8.0 | 30 | 19 |
| 59 | 10 | 0.8 | E | 70 | 11.2 | 6.2 | 16.8 | 7.9 | 29 | 20.5 |
| 60 | 10 | 0.8 | F | 70 | 11.5 | 6.5 | 16.5 | 8.2 | 28 | 19 |
| Example 126 | 10 | 13.0 | A | 85 | 12.0 | 10.2 | 18.6 | 12.5 | 31 | 28 |
| Comparative Example 61 | 10 | 16.0 | A | 80 | 10.5 | 5.2 | 16.0 | 8.0 | 28 | 15.5 |
| Example 127 | 5 | 0.8 | A | 85 | 12.0 | 10.2 | 18.6 | 12.5 | 30 | 28 |
| 128 | 50 | 0.8 | A | 85 | 12.2 | 9.9 | 18.5 | 13.0 | 31 | 29 |
| 129 | 90 | 0.8 | A | 85 | 12.0 | 10.5 | 18.0 | 12.4 | 32 | 28 |
| Comparative Example 62 | — | 0 | A | 65 | 8.0 | 3.2 | 12.1 | 6.0 | 31 | 19 |

Note:
(*)-Refer to Table 9

EXAMPLES 130 THROUGH 132 AND COMPARATIVE EXAMPLES 63 THROUGH 65

In Example 130, the same procedures as those described in Example 123 were carried out, except that the surface coating liquid was a solution of a surface coating material consisting of 3% by weight of γ-glycidoxypropyltrimethoxysilane (silane coupling compound) and 3% by weight of DENACOL EX-421 (polyepoxide compound) in toluene, that the surface coating liquid was applied to the cord prepared from the melt-spun multifilament yarns which were oiled with a usual oiling agent, and that the surface coated cord was dried at 100° C. for 60 seconds, and heat-treated at 230° C. for 120 seconds.

In Examples 131 and 132, the same procedures as those described in Example 130 were carried out, except that the surface coating liquid contained the silane coupling compound and the polyepoxide compound in amounts as indicated in Table 26.

those described in Example 130 were carried out, except that the cord used was the same as that used in Comparative Example 62.

The results are indicated in Table 26.

TABLE 26

| Example No. | Type of cord | Silicon dioxide fine particles Silane coupling compound (% by wt.) | Silicon dioxide fine particles Polyepoxide compound (% by wt.) | Heat resistance (%) | CRA-bonding strength (kg/5c) Vulcanization 150° C. 30 min | CRA-bonding strength (kg/5c) Vulcanization 170° C. 90 min | T-bonding strength (kg/5cm) Vulcanization 150° C. 30 min | T-bonding strength (kg/5cm) Vulcanization 170° C. 90 min | Resistance to peeling (kg/3cm) Vulcanization 150° C. 30 min | Resistance to peeling (kg/3cm) Vulcanization 170° C. 90 min |
|---|---|---|---|---|---|---|---|---|---|---|
| Comparative Example 63 | Example 123 | — | 3 | 60 | 10.5 | 5.5 | 16.0 | 8.0 | 29 | 19.0 |
| 64 | Comparative Example 62 | — | 3 | 55 | 10.7 | 5.6 | 16.4 | 8.0 | 28 | 17.5 |
| Example 130 | Example 123 | 3 | 3 | 85 | 12.5 | 10.5 | 18.4 | 13.5 | 32 | 28.0 |
| 131 | Example 123 | 5 | 3 | 85 | 12.6 | 10.7 | 18.5 | 13.6 | 31 | 29.0 |
| 132 | Example 123 | 10 | 3 | 80 | 12.5 | 10.3 | 18.4 | 13.1 | 31 | 26.5 |
| Comparative Example 65 | Comparative Example 62 | 3 | 3 | 55 | 10.8 | 5.5 | 15.8 | 8.0 | 28 | 19.5 |

EXAMPLES 133 THROUGH 136 AND COMPARATIVE EXAMPLES 66 AND 67

In Example 133, the same procedures as those described in Example 103 were carried out, except that in the preparation of the pre-treating liquid, the addition of SUMIKANOL 750 was omitted.

In Examples 134, 135 and 136, the same procedures as those described repectively in Examples 104, 105 and 106, were carried out, except that the pre-treating liquid used was the same as that described in Example 133.

In Comparative Examples 66 and 67, the same procedures as those described repectively in Comparative Examples 48 and 49, were carried out, except that the pre-treating liquid used was the same as that used in Example 133.

The results of the test are shown in Table 27.

TABLE 27

| Example No. | Silicon dioxide fine particle Average size (mμ) | Silicon dioxide fine particle Amount (% wt.) | Surface coating material Silane coupling compound (g) | Surface coating material Poly-epoxide compound (g) | Heat resistance (%) | CRA-bonding strength (kg/5c) Vulcanization 150° C. 30 min | CRA-bonding strength (kg/5c) Vulcanization 170° C. 90 min |
|---|---|---|---|---|---|---|---|
| Example 133 | 10 | 0.8 | 2.5 | 2.5 | 80 | 12.9 | 7.5 |
| Comparative Example 66 | 10 | 0.8 | — | 2.5 | 60 | 8.0 | 5.5 |
| Example 134 | 90 | 0.8 | 2.5 | 2.5 | 75 | 12.6 | 7.4 |
| 135 | 10 | 13 | 2.5 | 2.5 | 75 | 12.2 | 7.0 |
| Comparative Example 67 | 10 | 16 | 2.5 | 2.5 | 65 | 10.9 | 6.0 |
| Example 136 | 5 | 0.8 | 2.5 | 2.5 | 75 | 12.3 | 7.3 |

| Example No. | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min | Rubber coverage Vulcanizaton 150° C. 30 min | Rubber coverage Vulcanizaton 170° C. 90 min | Resistance to bending (mg) |
|---|---|---|---|---|---|---|---|
| Example 133 | 17.0 | 11.5 | 32 | 23 | 90 | 75 | 2500 |
| Comparative Example 66 | 13.0 | 9.0 | 18 | 15 | 50 | 25 | 1800 |
| Example 134 | 17.2 | 11.8 | 31 | 24 | 85 | 70 | 2000 |
| 135 | 17.1 | 11.5 | 30 | 23 | 85 | 70 | 2100 |
| Comparative Example 67 | 16.0 | 9.5 | 27 | 20 | 80 | 65 | 3500 |
| Example 136 | 17.2 | 11.5 | 31 | 23 | 85 | 70 | 2200 |

EXAMPLES 137 THROUGH 140

In each of the Examples 137 through 140, the same procedures as those described in Example 133 were carried out, except that the silane coupling compound used was as indicated in Table 28. The results of the tests are also indicated in Table 28.

TABLE 28

| Example No. | Silane coupling compound | Heat resistance (%) | CRA-bonding strength (kg/5c) Vulcanization 150° C. 30 min | CRA-bonding strength (kg/5c) Vulcanization 170° C. 90 min | T-bonding strength (kg/cm) Vulcanization 150° C. 30 min | T-bonding strength (kg/cm) Vulcanization 170° C. 90 min | Resistance to peeling (kg/3cm) Vulcanization 150° C. 30 min | Resistance to peeling (kg/3cm) Vulcanization 170° C. 90 min | Rubber coverage Vulcanization 150° C. 30 min | Rubber coverage Vulcanization 170° C. 90 min | Resistance to bending (mg) |
|---|---|---|---|---|---|---|---|---|---|---|---|
| 137 | Vinyl trichlorosiiane | 75 | 12.0 | 7.8 | 16.5 | 10.5 | 31 | 24 | 80 | 65 | 2500 |
| 138 | N—β(aminoethyl)-γ-aminopropyltrimethoxysilane | 60 | 11.5 | 7.5 | 16.0 | 10.4 | 28 | 22 | 80 | 60 | 2900 |
| 139 | γ-mercaptopropyl-trimethoxysilane | 80 | 12.3 | 7.5 | 17.0 | 10.5 | 30 | 23 | 85 | 65 | 2100 |
| 140 | Vinyl ethoxysilane | 75 | 12.0 | 7.0 | 16.5 | 10.7 | 31 | 24 | 85 | 65 | 2200 |

We claim:

1. A shaped polyester composite material having an activated surface thereof, comprising:
a shaped substrate comprising a polymeric matrix consisting essentially of an aromatic linear polyester and fine solid particles each comprising mainly silicon dioxide and having an average size of 5 to 100 millimicrons said silicon dioxide fine particles being dispersed in at least a portion of said shaped substrate and the amount of said fine particles being in the range of 0.3% to 15% based on the weight of said polyester matrix in which said fine particles are dispersed; and
a surface coating layer formed on the silicon dioxide fine particle-containing surface portion of said shaped substrate wherein said silicon dioxide fine particles are located and comprising from 0.5% to 10%, based on the weight of said shaped substrate, of a surface-activating material consisting of at least one member selected from the group consisting of silane coupling compounds and organic titanium compounds, and mixed with from 0.05% to 2%, based on the weight of said shaped substrate, of an additional material comprising at least one polyepoxide compound, said surface coating layer having been heat-treated together with said shaped substrate at a temperature of 50° C. or more but at least 10° C. below the melting point of said polyester matrix.

2. A shaped polyester composite material as claimed in claim 1, wherein said aromatic linear polyester has at least 85% by molar amount of securring units of the formula (I):

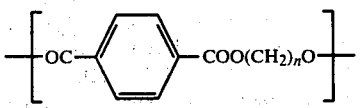

wherein n represents an integer of 2 to 6.

3. A shaped polyester composite material as claimed in claim 1, wherein the average size of said silicon dioxide fine particles is in the range of from 7 to 50 microns.

4. A shaped polyester composite material as claimed in claim 1, wherein the amount of said silicon dioxide fine particles is in the range of from 0.5 to 10% by weight.

5. A shaped polyester composite material as claimed in claim 1, wherein said fine particles comprise at least 80% by weight of silicon dioxide (SiO₂).

6. A shaped polyester composite material as claimed in claim 1, wherein said fine particles comprise mainly amorphous silicon dioxide.

7. A shaped polyester composite material as claimed in claim 1, wherein said silicon dioxide fine particles are uniformly distributed in said polyester matrix in said shaped substrate.

8. A shaped polyester composite material as claimed in claim 1, wherein said silicon dioxide fine particles are distributed only in a portion of said polyester matrix located in the surface portion of said shaped substrate.

9. A shaped polyester composite material as claimed in claim 1, wherein said shaped substrate is a filament or fiber.

10. A shaped polyester composite material as claimed in claim 9, wherein said filament or fiber substrate is composed of a core portion thereof comprising an aromatic linear polyester alone, and a sheath portion thereof formed around said core portion and comprising said polyester matrix and said silicon dioxide fine particles.

11. A shaped polyester composite material as claimed in claim 10, wherein the weight of said sheath portion is 5% or more based on the entire weight of said filament or fiber substrate.

12. A shaped polyester composite material as claimed in claim 10, wherein said aromatic linear polyester in said core portion exhibits an intrinsic viscosity of 0.6 or more.

13. A shaped polyester composite material as claimed in claim 1, wherein said shaped substrate is a film or sheet.

14. A shaped polyester composite material as claimed in claim 1, wherein said silane coupling compounds are of the formula (II):

R—SI—X₃  (II)

wherein R represents a member selected from the group consisting of vinyl, methacryl, allyl, epoxy, hydroxyl, amino and mercapto radicals and organic and inorganic functional radicals each having at least one chlorine atom, and; X represents a member selected from the group consisting of organic and inorganic groups capable of reacting with siloxane radical and/or silanol radicals.

15. A shaped polyester composite material as claimed in claim 1, wherein said silane coupling compound is selected from the group consisting of vinyl trichlorosilane, vinyl triethoxysilane, vinyl trimethoxysilane vinyltris(β-methoxyethoxy)silane, γ-methacryloxypropyltrimethoxysilane, γ-methacryloxypropyl-tris(β-methoxyethoxy)silane, β-(3,4-epoxycyclohexyl)ethyltrimethoxysilane, γ-glycidoxypropyltrimethoxysilane, vinyl triacetoxysilane, γ-mercaptopropyltrimethoxysilane, γ-aminopropyltriethoxysilane, N-β(aminoethyl)-γ-aminopropyltrimethoxysilane, bis(β-hydroxyethyl)-γ-aminopropyltrimethoxysilane, γ-chloropropyltrimethoxysilane, N-(trimethoxysilylpropyl)diethylenetriamine, N-(trimethoxysilylpropyl)urea, carboethoxyethylaminopropyltriethoxysilane, chloromethylphenyltrimethoxysilane, phenylaminopropyltrimethoxysilane, aminophenyltrimethoxysilane, and N-(dimethoxymethylsilylpropyl)ethylenediamine.

16. A shaped polyester composite material as claimed in claim 1, wherein said organic titanium compounds are of the formula (III):

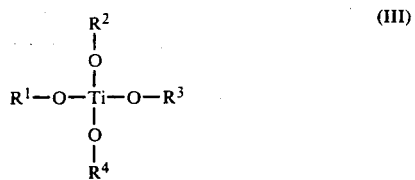

wherein R¹, R², R³ and R⁴ respectively represents, independently from each other, a member selected from the group consisting of alkyl, alkenyl and acyl radicals each having 2 to 24 carbon atoms.

17. A shaped polyester composite material as claimed in claim 1, wherein said organic titanium compound is selected from the group consisting of tetra-n-butyltitanate, tetrakis(2-ethylhexyl)titanate, tetrastearyltitanate, iso-propyl-tri-iso-stearoyltitanate and iso-propyl-iso-stearoyl-dimethacroyltitanate.

18. A shaped polyester composite material as claimed in claim 1, wherein said polyepoxide compound contains at least two epoxy groups per molecule thereof.

19. A polyester fiber material as claimed in claim 1, wherein said polyepoxide compound is selected from the group consisting of reaction products of polyhydric alcohols with halogenated epoxide compounds, reaction products of polyhydric phenol compounds with halogenated epoxide compounds and oxidation products of unsaturated organic compounds having at least one aliphatic double bond with peracetic acid or hydrogen peroxide.

20. A shaped polyester composite material as claimed in claim 1, wherein said polyepoxide compound is selected from polyglycidyl ethers of polyhydric alcohols, which are reaction products of epichlorohydrin with polyhydric alcohols.

21. A shaped polyester composite material as claimed in claim 19 or 20, wherein said polyhydric alcohol is selected from the group consisting of ethylene glycol, glycerol, diglycerol, diethylene glycol, sorbitol, pentaerythritol trimethylol propane, polyethylene glycols and polypropylene glycols.

22. A shaped polyester composite material as claimed in claim 19, wherein said halogenated epoxide compound is epichlorohydrin.

23. A shaped polyester composite material as claimed in claim 19, wherein said polyhydric phenol compound is selected from the group consisting of resorcin, catechol, 2,2-bis(4-hydroxyphenyl)propane, bis(4-hydroxyphenyl)dimethylmethane, phenol-formaldehyde resins and resorcin-formldehyde resins.

24. A shaped polyester composite material as claimed in claim 19, wherein said oxidation product is selected from the group consisting of 4-vinyl cyclohexene dioxide, 3,4-epoxycyclohexylmethyl-3,4-epoxycyclohexene carboxylate and bis(3,4-epoxy-6-methylcyclohexylmethyl)adipate.

25. A shaped polyester composite material as claimed in claim 1, wherein said surface coating layer contains, in addition to said surface activating material and said additional material, a further additional material comprising at least one blocked polyisocyanate compound of the formula (IV):

A—(NHCOY)m     (IV)

wherein Y represents a residue of a blocking compound which residue is capable of dissociating from the blocked polyisocyanate when heat-treated, m represents an integer of 2 or more and A represents an m-valent radical, said further additional material having been heat-treated.

26. A shaped polyester composite material as claimed in claim 25, wherein said blocked polyisocyanate compound is an addition product of a polyisocyanate compound with a blocking compound selected from the group consisting of phenol compounds, aliphatic tertiary alcohol compounds, aromatic secondary amine compounds, aromatic imide compound lactam compounds, oxime compounds and sodium hydrogen sulfite.

27. A polyester fiber composite material as claimed in claim 26, wherein said blocking compound is from the group consisting of phenol, thiophenol, cresol, resorcin, tert-butyl alcohol, tert-pentyl alcohol, diphenyl amine, xylidine, phthalic acid imide, caprolactam, valerolactam, acetoxime, methylethylketoneoxime, cyclohexane oxime and sodium hydrogen sulfite.

28. A shaped polyester composite material as claimed in claim 26, wherein said polyisocyanate compound is selected from the group consisting of tolylene diisocyanate methaphenylene diisocyanate, diphenylene diisocyanate, hexamethylene diisocyanate, polymethylenepolyphenyleneisocyanate, triphenylmethane triisocyanate, and addition product of above-mentioned polyisocyanate compounds with polyol compounds having two or more activated hydrogen atoms, in the molar ratio of the isocyanate radicals to the hydroxyl radicals of 1:1.

29. A shaped polyester composite material as claimed in claim 25, wherein said further additional material is in an amount of 0.1 to 10% based on the weight of said shaped substrate.

30. A shaped polyester composite material as claimed in claim 25, wherein said surface coating layer contains, in addition to said surface activating material, said additional material and said further additional material, a still further additional material comprising at least one rubber latex, said still further additional material having been heat-treated.

31. A shaped polyester composite material as claimed in claim 30, wherein said still further additional material is in an amount of 0.1 to 10% based on the weight of said shaped substrate.

32. A shaped polyester composite material as claimed in claim 30, wherein said rubber latex is selected from the group consisting of natural rubber latexes, styrene-butadiene copolymer latexes, butadiene-vinyl pyridine copolymer latexes, vinyl pyridine-styrene-butadiene terpolymer latexes, acrylonitrile rubber latexes, acrylonitril-butadiene copolymer latexes and chloroprene rubber latexes.

* * * * *